(12) United States Patent
Wakabayashi et al.

(10) Patent No.: US 8,009,526 B2
(45) Date of Patent: Aug. 30, 2011

(54) OPTICAL PICKUP DEVICE AND COLLIMATE LENS

(75) Inventors: Kanji Wakabayashi, Kyoto (JP); Fumitomo Yamasaki, Nara (JP); Yoshiaki Komma, Osaka (JP); Hironori Tomita, Nara (JP)

(73) Assignee: Panasonic Corporation, Osaka (JP)

( * ) Notice: Subject to any disclaimer, the term of this patent is extended or adjusted under 35 U.S.C. 154(b) by 58 days.

(21) Appl. No.: 12/667,877

(22) PCT Filed: Oct. 10, 2008

(86) PCT No.: PCT/JP2008/002866
§ 371 (c)(1),
(2), (4) Date: Jan. 6, 2010

(87) PCT Pub. No.: WO2009/047907
PCT Pub. Date: Apr. 16, 2009

(65) Prior Publication Data
US 2010/0177621 A1 Jul. 15, 2010

(30) Foreign Application Priority Data
Oct. 10, 2007 (JP) .................................. 2007-264309

(51) Int. Cl.
*G11B 7/00* (2006.01)
(52) U.S. Cl. .................... 369/44.32; 369/53.19
(58) Field of Classification Search ............... 369/44.32, 369/53.12, 112.1, 112.03, 112.04, 53.18, 369/53.19, 53.42
See application file for complete search history.

(56) References Cited

U.S. PATENT DOCUMENTS

| 5,623,466 | A | 4/1997 | Itonaga | |
|---|---|---|---|---|
| 7,406,007 | B2* | 7/2008 | Kuze et al. | 369/44.32 |
| 2002/0097504 | A1 | 7/2002 | Kitamura et al. | |
| 2005/0007906 | A1 | 1/2005 | Horinouchi et al. | |
| 2005/0078574 | A1 | 4/2005 | Wada et al. | |
| 2008/0031103 | A1 | 2/2008 | Horinouchi et al. | |

FOREIGN PATENT DOCUMENTS

| CN | 1623191 | 6/2005 |
|---|---|---|
| EP | 0 497 291 | 8/1992 |

(Continued)

OTHER PUBLICATIONS

International Search Report issued Jan. 20, 2009 in International (PCT) Application No. PCT/JP2008/002866.

(Continued)

*Primary Examiner* — Nabil Z Hindi
(74) *Attorney, Agent, or Firm* — Wenderoth, Lind & Ponack, L.L.P.

(57) ABSTRACT

It is an object of the present invention to provide an optical pickup device being capable of correcting coma aberration induced in a light-condensing optical system including an objective lens for an optical disc and having a reduced size and a reduced thickness in comparison with the conventional art. The present invention includes a first coma-aberration correction actuator (6) including a first tilt drive portion for inclining an objective lens in a first tilt direction, and a second coma-aberration correction actuator (7) including a second tilt drive portion for inclining, in a second tilt direction, a coma-aberration correction lens placed between a light source and a raising mirror for reflecting emitted light toward the objective lens.

25 Claims, 16 Drawing Sheets

FOREIGN PATENT DOCUMENTS

| | | |
|---|---|---|
| JP | 4-245028 | 9/1992 |
| JP | 5-234241 | 9/1993 |
| JP | 7-272301 | 10/1995 |
| JP | 8-185638 | 7/1996 |
| JP | 2001-143312 | 5/2001 |
| JP | 2002-140831 | 5/2002 |
| JP | 2004-013946 | 1/2004 |
| JP | 2004-103087 | 4/2004 |
| JP | 2005-32286 | 2/2005 |

OTHER PUBLICATIONS

Chinese Office Action issued Mar. 18, 2011 in corresponding Chinese Patent Application No. 200880101015 (in the English language).

English translation of International Preliminary Report on Patentability and Written Opinion of the International Searching Authority issued May 11, 2010 in International (PCT) Application No. PCT/JP2008/002866.

* cited by examiner

OPTICAL PICKUP DEVICE AND COLLIMATE LENS

TECHNICAL FIELD

The present invention relates to an optical pickup device which plays back or records information from or on information recording mediums represented by optical discs and, also, a collimating lens included in the optical pickup device.

BACKGROUND ART

Digital versatile discs (DVDs) are known as optical discs capable of storing large-capacity data, since they can store digital information with recording densities of about 6 times those of compact discs (CDs). In recent years, along with increases of amounts of information to be recorded in optical discs, there has been a need for optical discs with larger capacities. In order to increase the capacity of an optical disc, it is necessary to reduce the size of a light spot formed by light directed to the optical disc during recording information onto the optical disc and during playing back information recorded on the optical disc to increase the information recording density. The size of the light spot can be reduced, by employing laser light with a short wavelength from a light source and also employing an objective lens with a larger numerical aperture (NA). For DVDs, a light source with a wavelength of 660 nm and an objective lens with a numerical aperture (NA) of 0.6 are used. Further, by employing a blue laser with a wavelength of 405 nm and an objective lens with an NA of 0.85, for example, it is possible to attain a recording density of 5 times the recording density of a current DVD. Further, hereinafter, such an optical disc will be referred to as a BD.

On the other hand, a coma aberration is induced by an inclination of the objective lens with respect to an optical disc, and the degree of the coma aberration increases in proportion to the cube of the numerical aperture. Accordingly, it is necessary to position, with high accuracy, the optical axis of the objective lens with respect to the optical disc, in order to obtain preferable recording/playback signals.

Therefore, there have been contrived various methods for driving an objective lens to tilt it for inclining the objective lens for correcting coma aberrations, in an objective-lens actuator incorporating the objective lens for driving the objective lens in a focusing direction and in a tracking direction. Further, conventionally, coma-aberration correction by tilt-driving of an objective lens is for correcting coma aberrations in a radial direction (the direction of a radius) of an optical disc.

Further, there have been suggested various methods for correcting coma aberrations by placing an aberration-correction device on an optical path between a light source and an objective lens, rather than by inclining an objective lens for correcting coma aberrations.

For example, a liquid crystal device having a coma-aberration correcting function can be placed on an optical path between a light source and an objective lens, in order to adjust the amount of coma-aberration correction through the voltage applied to the liquid crystal device.

However, the coma-aberration correcting method using the liquid crystal device can correct only angular deviations at low frequencies and, therefore, has the problem of difficulty in reducing coma aberrations induced over a wide range from a low frequency to a high frequency. Further, the coma-aberration correcting method has the problem that a liquid crystal device is more expensive than a lens, which prevents cost reduction.

Further, there has been a device as follows, as a conventional technique which discloses another method for correcting coma aberrations by placing an aberration correcting device on an optical path from a light source to an objective lens (refer to Patent Citation 1).

According to the Patent Citation 1, a coma-aberration correction actuator incorporating an aberration-correction lens as an aberration correction device is placed on an optical path from a light source to an objective lens, and the amount of the inclination of the aberration correction lens with respect to the optical axis is controlled for correcting coma aberrations. The coma-aberration correction actuator is constituted by three VCMs (Voice Coil Motors) placed at substantially equal intervals in a circumferential direction of the aberration correction lens. By controlling the respective amounts of movements of the three VCMs, the amount of the tilt (the amount of the inclination) of the aberration correction lens is controlled, which enables reduction of coma aberrations induced over a wide range from a low frequency to a high frequency.

Patent Citation 1: JP-A No. 2002-140831

DISCLOSURE OF INVENTION

Technical Problem

As described in the aforementioned Patent Citation 1, conventionally, the amount of the inclination of the aberration correction lens has been controlled, which can correct coma aberrations in a radial direction and a tangential direction (the direction of a tangent) of optical discs. In this case, coma aberration correction through the objective lens is not necessary and, therefore, is not performed.

However, this structure involves a complicated coma-aberration correction actuator mechanism, which results in the problem of an increase of the size of the mechanism itself. This will be described, in detail, hereinafter.

Namely, it is necessary to provide the VCMs as a drive portion in the coma-aberration correction actuator and, also, it is necessary to provide a radial-direction suspension for guiding the tilt movement of the aberration correction lens in the radial direction, and a tangential-direction suspension for guiding the tilt movement of the aberration correction lens in the tangential direction, independently of each other. A concrete structure of these suspensions is a structure in which the suspension for the radial direction or the tangential direction supports an intermediate member and, through the intermediate member, the suspension for the other direction supports the aberration correction lens. Accordingly, there is the problem that the structure is significantly complicated and, further, crosstalk can occur in the radial direction and the tangential direction.

Further, the complicated structure increases the size of the coma-aberration correction actuator. Particularly, the radial-direction suspension is a mechanism for rotating the aberration correction lens about an axis parallel with the focusing direction and, therefore, is required to be formed along the focusing direction. Accordingly, the coma-aberration correction actuator is increased in size in the focusing direction, namely in a thickness direction of an optical disc. This becomes a significant problem in optical pickup devices which are required to have smaller thicknesses.

Further, it is possible to provide a structure for correcting coma aberrations in both the radial direction and the tangential direction, in the objective-lens actuator. However, in this case, similarly to in the case of the coma-aberration correction actuator, there is a need for providing respective suspensions for the radial direction and the tangential direction independently of each other, which induces the problem of degradation of the resonance characteristics of the objective-lens actuator and, also, induces the problem of an increase of the size of the objective-lens actuator.

Further, in order to perform recording and playback for the BDs with a single objective-lens actuator which involve use of blue laser, in addition to recording and playback for CDs and DVDs, there have been developed a two-lenses type objective-lens actuator which incorporates two objective lenses, which are an objective lens for CDs and DVDs and an objective lens for BDs. Even in the case of such two-lenses actuator, it is necessarily necessary to correct the coma aberrations in the respective lenses and the coma aberration induced by the inclination of the optical disc. However, in this case, one of the objective lenses can be fixed after adjustments of the inclination of the objective lens in, for example, mounting the objective-lens actuator to an optical pickup device, but it is necessary to perform inclination adjustments on the other objective lens without changing a positional relationship between the optical disc and the one objective lens which has been already adjusted. Furthermore, these objective lenses are significantly small and, therefore, the adjustments of their positions involve significantly hard operations. This has induced the problem of necessity of a large-scale lens adjustment device and adjustment operation processing.

Further, the BDs are expected to have more information recording surfaces while currently having two information recording surfaces at a maximum, which increases a distance from the information recording surface closest to the surface of the optical disc to the information recording surface farthest therefrom to be larger than that of in the current condition. If the distance increases, this will increase the coma aberration in the tangential direction of the optical disc. Therefore, in the future, the coma-aberration correction in the tangential direction will become an important challenge.

The present invention is made in order to overcome the conventional problems and aims at providing an optical pickup device being capable of correcting coma aberrations induced in a light-condensing optical system including an objective lens for optical discs and having a smaller size and a smaller thickness than in the conventional art and, also, providing a collimating lens included in this optical pickup device.

Technical Solution

According to the present invention, there are provided structures as follows, in order to attain the object.

According to a first aspect of the present invention, there are provided an optical pickup device which records or plays back information in or from an optical recording medium by condensing a luminous flux emitted from a light source onto the optical recording medium through a light-condensing optical system, the optical pickup device comprising: a first coma-aberration correction actuator including a first tilt drive portion configured to incline, in a first tilt direction, an objective lens for converging emitted light onto said optical recording medium; and a second coma-aberration correction actuator including a second tilt drive portion configured to incline, in a second tilt direction, a coma-aberration correction lens placed between said light source and a raising mirror for reflecting said emitted light toward said objective lens.

In the first aspect, the coma-aberration correction lens may be a collimating lens configured to convert divergent light emitted from said light source into substantially-parallel light.

In the first aspect, the collimating lens may be a meniscus lens having a first surface which is convex and is close to said raising mirror and a second surface which is concave and is close to said light source, the collimating lens may satisfy a condition r1<r2, assuming that an absolute value of a paraxial radius of curvature of said first surface is r1, and an absolute value of a paraxial radius of curvature of said second surface is r2, and at least one of said first surface and said second surface has an aspherical surface shape.

In the first aspect, the aberration induced in the light spot converged on the optical recording medium by an inclination of the collimating lens may be constituted substantially only by a third-order coma aberration.

In the first aspect, the present invention may be structured as follows. That is, the second coma-aberration correction actuator includes an elastic support spring, this elastic support spring has a center axis at least in the direction parallel to the optical recording medium and supports the coma-aberration correction lens at the opposite sides of the coma-aberration correction lens such that the coma-aberration correction lens can tilt about the center axis, and the second tilt drive portion drives the coma-aberration correction lens to tilt it about the center axis, there are provided two or more objective lenses intended for luminous fluxes with two or more wavelengths which are emitted from the light source, the two or more objective lenses are mounted in the single first coma-aberration correction actuator, and the first coma-aberration correction actuator is capable of driving the two or more objective lenses in three directions which are a focusing direction which is a direction perpendicular to the optical recording medium, a tracking direction which is a direction parallel to a radial direction of the optical recording medium, and the first tilt direction corresponding to a tilt direction which is a direction about an axis parallel to a tangential direction of the optical recording medium.

In the first aspect, the first tilt direction may be the direction of correction of coma aberration in the radial direction of the optical recording medium, and the second tilt direction may be the direction of correction of coma aberration in the tangential direction of the optical recording medium.

In the first aspect, the optical pickup device may include an optical base configured to mount the light-condensing optical system thereon, wherein a height from the lower surface of the optical base to the apex of the objective lens is 21 mm or less.

In the first aspect, at least the coma-aberration correction lens may be placed such that its optical axis is along a direction parallel to the tangential direction of the optical recording medium, and a luminous flux may be folded, by the raising mirror, in a direction perpendicular to the optical recording medium and then enter to the objective lens.

In the first aspect, the first coma-aberration correction actuator may be an objective-lens actuator including a movable member including the objective lens and a lens holder for holding the objective lens, a base, and a rod-type elastic support member which supports the movable member movably with respect to the base in the focusing direction, the tracking direction and the first tilt direction.

In the first aspect, the optical pickup device may include a spherical-aberration correction actuator including a carriage configured to support the coma-aberration correction lens and a drive portion configured to drive the carriage in the tangential direction of the optical recording medium, wherein the second coma-aberration correction actuator may be mounted in the carriage.

In the first aspect, the inclination angle of the coma-aberration correction lens mounted in the second coma-aberration correction actuator may be changed according to a position of the carriage in the tangential direction of the optical recording medium.

In the first aspect, the inclination angle of the coma-aberration correction lens mounted in the second coma-aberration correction actuator may be made constant, regardless of a position of the carriage in the tangential direction of the optical recording medium.

In the first aspect, the coma-aberration correction lens may be placed on the same optical path for passing, therethrough, luminous fluxes with the two or more wavelengths.

In the first aspect, the second tilt drive portion may be placed only in the side closer to the optical recording medium or only in the side farther therefrom with respect to the center axis.

In the first aspect, the second tilt drive portion may be placed at a position which forms an angle less than 90 degrees with respect to the center axis about the optical axis of the coma-aberration correction lens.

In the first aspect, the optical pickup device may include two second tangential tilt drive portions, wherein the two second tangential tilt drive portions are placed at two positions which form the same angle less than 90 degrees with respect to the center axis about the optical axis of the coma-aberration correction lens.

In the first aspect, with respect to the second coma-aberration correction actuator, magnets may be mounted in a movable portion including the coma-aberration correction lens, such that, by supplying electricity to driving coils secured to a fixture portion which supports the coma-aberration correction lens through the elastic support spring, the coma-aberration correction lens may be driven to tilt about the center axis.

In the first aspect, with respect to the second coma-aberration correction actuator, magnets may be secured to a fixture portion which supports the coma-aberration correction lens through the elastic support spring, such that, by supplying electricity to a driving coil mounted in a movable portion including the coma-aberration correction lens, the coma-aberration correction lens may be driven to tilt about the center axis.

In the first aspect, with respect to the second coma-aberration correction actuator, a movable portion including the coma-aberration correction lens and a fixture portion which supports the coma-aberration correction lens through the elastic support spring may be coupled to each other through a piezoelectric device, such that, by applying a voltage between the opposite ends of the piezoelectric device, the coma-aberration correction lens may be driven to tilt about the center axis.

In the first aspect, with respect to the second coma-aberration correction actuator, respective electrostatic terminals may be mounted in a movable portion including the coma-aberration correction lens and a fixture portion which supports the coma-aberration correction lens through the elastic support spring, such that, by applying potential differences across the electrostatic terminals, the coma-aberration correction lens may be driven to tilt about the center axis.

A second aspect of the present invention provides a collimating lens included in an optical pickup device which records or plays back information in and from an optical recording medium by condensing light emitted from a light source onto the optical recording medium through an objective lens: wherein the collimating lens converts divergent light emitted from the light source into substantially-parallel light, the collimating lens is a meniscus lens having a first surface which is convex and is close to the objective lens and a second surface which is concave and is close to the light source, and satisfies a relationship $r1 < r2$, assuming that an absolute value of a paraxial radius of curvature of the first surface is r1, and an absolute value of a paraxial radius of curvature of the second surface is r2, and at least one of the first surface and the second surface has an aspherical surface shape.

A third aspect of the present invention provides a collimating lens included in an optical pickup device which records or plays back information in and from an optical recording medium by condensing light emitted from a light source onto the optical recording medium through an objective lens: wherein the collimating lens converts divergent light emitted from the light source into substantially-parallel light, an offense against a sine condition SC for a wavelength of $\lambda$ satisfies a condition $-0.0015 > SC > -0.2$, assuming that a height of the position on the collimating lens which is farthest from the optical axis is h, an angle which a light ray passed through the position at the height h forms with the optical axis is $\theta$, a focal length for light with a wavelength of $\lambda$ is f, and the offense against the sine condition SC is defined as $SC = h/(f \cdot \sin \theta) - 1$.

ADVANTAGEOUS EFFECTS

According to the first aspect of the present invention, there is provided a structure which performs coma-aberration correction, separately, by the first coma-aberration correction actuator for inclining the objective lens in the first tilt direction and the second coma-aberration correction actuator for inclining the coma-aberration correction lens in the second tilt direction. This can simplify the respective suspension structures for supporting the objective lens and the coma-aberration correction lens, which can reduce the size of the coma-aberration correction actuator. This can realize reduction of the size and the thickness of the optical pickup device.

Further, according to the second aspect and the third aspect of the present invention, the coma-aberration correction lens is constituted by a collimating lens suitable for designs having coma-aberration correcting functions. This can reduce the number of components, as a matter of cause, and also can reduce the volume occupied by the optical system, thereby realizing further reduction of the size and the thickness of the optical pickup device.

Further, the first tilt direction is set to the direction of the correction of coma aberrations in the radial direction of the optical recording medium, which enables correcting the coma aberration in the radial direction which is required to be corrected over a large range, by the first coma-aberration correction actuator which can be easily inclined in the radial direction. This enables effective utilization of the occupied volume. Further, the second tilt direction is set to the direction of the correction of coma aberration in the tangential tilt direction of the optical recording medium. This enables making the axis for the inclination of the coma-aberration correction lens to be along a direction parallel with the optical recording medium, in the case where the optical axis of the coma-aberration correction lens is made parallel with the tangential direction of the optical recording medium. Accordingly, by making the optical axis thereof parallel with the tangential direction of the optical recording medium, it is possible to reduce the size of the optical pickup device in the direction parallel with the radial direction of the optical recording medium. This can reduce the size of the optical disc device which incorporates the optical pickup device, in a depth direction along the direction parallel with the radial direction. Furthermore, even when a suspension for rotatably supporting the coma-aberration correction lens is structured, it is possible to prevent the optical pickup device from having an increased size in a thickness direction, namely in the thickness direction of the loaded optical disc, thereby realizing reduction of the sizes and the thicknesses of the optical pickup device and the optical disc device.

By applying the optical pickup device according to the present invention to a thin-type optical pickup device having a height of 21 mm or less from the lower surface of the optical base to the apex of the objective lens, it is possible to realize reduction of the size and the thickness more effectively.

Further, by applying the optical pickup device according to the present invention to an optical pickup device adapted such that the optical axis of the coma-aberration correction lens is parallel to the tangential direction of the optical recording medium, it is possible to preferably place the axis for the inclination of the coma-aberration correction lens in a direction parallel to the optical recording medium. Since the optical axis is made parallel to the tangential direction of the optical recording medium, it is possible to reduce the size of the optical pickup device in the direction parallel to the radial direction of the optical recording medium. This can reduce the size of the optical disc device including the optical pickup device in the depth direction (the direction parallel to the radial direction). Furthermore, even when a suspension for rotatably supporting the coma-aberration correction lens is structured, it is possible to prevent the optical pickup device from having an increased size in the thickness direction, namely in the thickness direction of the loaded optical disc, which can realize reduction of the sizes and the thicknesses of the optical pickup device and the optical disc device.

Further, by employing the objective-lens actuator including the rod-type elastic support member for supporting the movable member movably in the focusing direction, the tracking direction and the first tilt direction with respect to the base, it is possible to realize the first coma-aberration correction actuator without changing the suspension for the objective lens.

Further, a suspension is formed from the elastic support spring in the second coma-aberration correction actuator. In this case, the elastic support spring has a center axis at least in the direction parallel to the optical recording medium and supports the coma-aberration correction lens at the opposite sides of the coma-aberration correction lens such that the coma-aberration correction lens can tilt about the center axis. With this structure, it is possible to realize reduction of the thickness of the second coma-aberration correction actuator, which enables reduction of the thickness of the optical pickup device.

Further, by providing the spherical-aberration correction actuator and mounting the second coma-aberration correction actuator in the carriage for the spherical-aberration correction actuator, it is possible to perform coma-aberration correction with the optical pickup device capable of correcting spherical aberrations induced by the change of the substrate thicknesses of optical recording mediums. Accordingly, it is possible to effectively reduce the size and the thickness of the high-density optical disc device which performs recording and playback with higher accuracy.

Further, it is possible to provide a structure which changes the inclination angle of the coma-aberration correction lens mounted in the second coma-aberration correction actuator, according to the position of the carriage in the tangential direction. This enables correction of the coma aberration induced depending on the position of the coma-aberration correction lens, thereby further improving the quality of record/playback signals in the optical pickup device.

Further, it is possible to make the inclination angle of the coma-aberration correction lens mounted in the second coma-aberration correction actuator constant, regardless of the position of the carriage in the tangential direction of the optical recording medium. This enables correction of induced coma aberrations through simple control, which can further improve the quality of the recording/playback signals in the optical pickup device.

Further, by mounting two or more objective lenses intended for light sources with a plurality of wavelengths to the objective-lens actuator capable of driving in the first tilt direction, it is possible to correct coma aberration induced in at least one optical system, out of the respective optical systems intended for the respective wavelengths. This eliminates the necessity of a process for adjusting coma aberration initially induced in the optical system intended for at least a single wavelength. Namely, in an optical pickup device which requires adjustments of coma aberrations in at least two types of objective lenses, it is possible to eliminate the process for adjusting the tilts of the objective lenses in the movable portion of the objective-lens actuator which is elastically supported. This can eliminate the complicated process which tends to induce failures of assembled components as described above, which can reduce the cost, due to the reduction of the number of processes and the prevention of reduction of the yield.

Further, by placing the coma-aberration correction lens on a single optical path for passing, therethrough, a plurality of luminous fluxes emitted from light sources with the plurality of wavelengths, it is possible to correct respective coma aberrations induced in the optical systems intended for the respective wavelengths. This completely eliminates the necessity of process for adjusting initially-induced coma aberrations. Therefore, due to the elimination of the initial coma-aberration adjustment process, it is possible to reduce the number of processes, thereby further reducing the cost.

Further, by placing the second tilt drive portion only in the side closer to the optical recording medium or only in the side farther therefrom with respect to the center axis, it is possible to reduce the thickness of the optical pickup device.

Further, by placing the second tilt drive portion at a position which forms an angle less than 90 degrees with respect to the center axis about the optical axis of the coma-aberration correction lens, it is possible to further reduce the thickness of the optical pickup device.

Also, two second tangential tilt drive portions described above can be provided and, also, the two second tangential tilt drive portions can be placed at two positions which form the same angle less than 90 degrees with the center axis about the optical axis of the coma-aberration correction lens, which realizes symmetric tilt driving, thereby realizing tilt driving with higher accuracy.

Also, in the second coma-aberration correction actuator, the magnets are mounted in the movable portion including the coma-aberration correction lens, and the driving coils are secured to the fixture portion which supports the coma-aberration correction lens through the elastic support spring. By supplying electricity to the driving coils, the coma-aberration correction lens can be driven to tilt about the center axis. This eliminates the necessity of wirings for supplying electricity to the movable portion, thereby suppressing the transfer of heat generated in the driving coils to the coma-aberration correction lens. This can suppress the change of characteristics of the optical pickup device, thereby improving the reliability.

Also, in the second coma-aberration correction actuator, the magnets can be secured to the fixture portion which supports the coma-aberration correction lens through the elastic support spring, while the driving coils can be mounted to the movable portion including the coma-aberration correction lens. By supplying electricity to the driving coils, the coma-aberration correction lens can be driven to tilt about the center axis. Accordingly, only the magnets are mounted in the fixture portion, namely the carriage, it is possible to further reduce the size of the spherical-aberration correction actuator incorporating the coma-aberration correction actuator, in its entirety.

Also, in the second coma-aberration correction actuator, the movable portion including the coma-aberration correction lens and the fixture portion which supports the coma-aberration correction lens through the elastic support spring are coupled to each other through a piezoelectric device. By applying a voltage between the both ends of the piezoelectric device, the coma-aberration correction lens can be driven to tilt about the center axis. This can simplify the structure and enables electric power saving, which prevents heat generation due to the driving, thereby enabling to suppress the change of characteristics of the optical pickup device and improve the reliability.

Further, in the second coma-aberration correction actuator, respective electrostatic terminals are mounted in the movable portion including the coma-aberration correction lens and the fixture portion which supports the coma-aberration correction lens through the elastic support spring. By applying potential differences to the electrostatic terminals, the coma-aberration correction lens can be driven to tilt about the center axis. This simplifies the structure and enables electric power saving, which prevents heat generation due to the driving, thereby enabling to suppress the change of characteristics of the optical pickup device and improve the reliability.

EXPLANATION OF REFERENCE

1; Optical disc,
F; Focusing direction,
T; Tracking direction,
T1; Axis T1,
Y; Tangential direction,
Y1; Rotational axis,
R; Radial tilt direction,
S; Tangential tilt direction,
4a; Blue-intended objective lens,
4b; Red/infrared-intended objective lens,
6; Objective-lens actuator,
7; Collimating lens actuator,
16; Objective-lens actuator drive circuit portion,
17; Blue laser,
18a; Red unit,
18b; Infrared unit,
21; Collimating lens, and
65; Tangential tilt drive circuit portion.

BEST MODE FOR CARRYING OUT THE INVENTION

Hereinafter, embodiments of the present invention will be described with reference to the drawings.

First Embodiment

Figure 1:
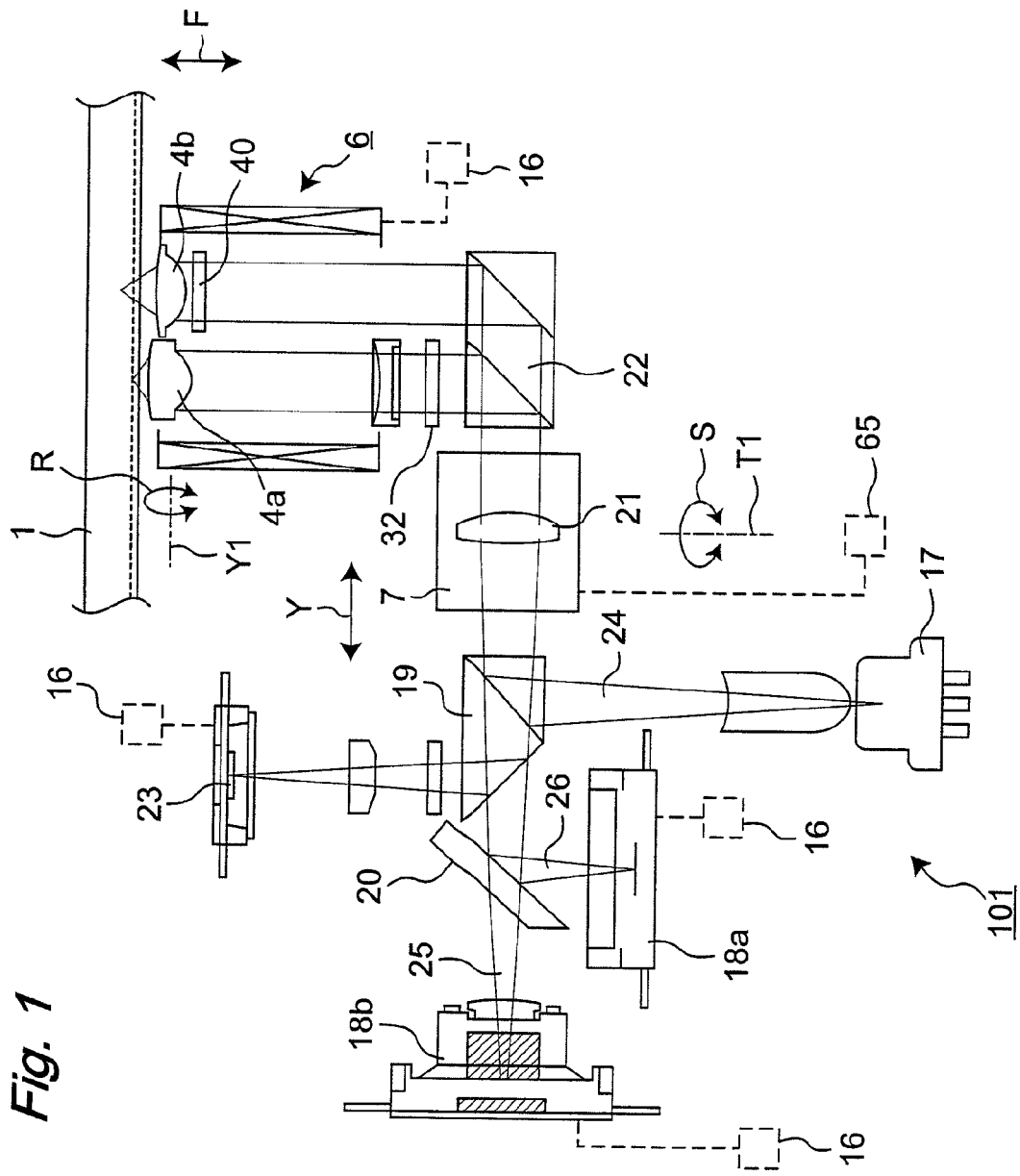
FIG. 1 is a structural view illustrating the structure of an optical pickup device according to a first embodiment of the present invention.

With reference to FIG. 1, there will be described a structure of an optical pickup device 101 according to a first embodiment of the present invention.

The optical pickup device 101 according to the present embodiment is an optical pickup device which records and plays back information, by condensing a luminous flux emitted from a light source toward an optical disc as an optical recording medium, onto the optical recording medium through a light-condensing optical system. This optical pickup device 101 generally includes the light source, a first coma-aberration correction actuator and a second coma-aberration correction actuator. In this case, the first and second coma-aberration correction actuators constitute a portion of the light-condensing optical system. Further, the first coma-aberration correction actuator includes a first tilt drive portion for inclining, in a first tilt direction, an objective lens for converging the emitted light to the optical disc. The second coma-aberration correction actuator includes a second tilt drive portion for inclining, in a second tilt direction, a coma-aberration correction lens placed between the light source and a raising mirror for reflecting the emitted light toward the objective lens. These components will be described later in detail.

The optical pickup device 101 according to the present embodiment incorporates three types of laser light sources for blue light with a wavelength of 405 nm, red light with a wavelength of 650 nm and infrared light with a wavelength of 780 nm, in order to address recording and playback for three types of optical discs 1 with substrate thicknesses of 0.1 mm, 0.6 mm and 1.2 mm. Further, the substrate thickness refers to a distance from a laser-light incidence surface of the optical disc to an information recording surface thereof in a thickness direction of the optical disc.

Further, in order to address recording and playback for the three types of optical discs 1, in the optical pickup device 101, an objective-lens actuator 6, which corresponds to an example of the first coma-aberration correction actuator, includes two objective lenses, namely an objective lens 4a for passing the blue laser light therethrough and an objective lens 4b for passing the red light and infrared light therethrough.

The objective lens 4a is intended for only blue light beams and is designed to form a focal point on the information recording surface of an optical disc 1 with a substrate thickness of 0.1 mm. The objective lens 4b is compatibly designed to cause light beams with two types of wavelengths, namely red and infrared light beams, to form a focal point on the information recording surface of each of optical discs with substrate thicknesses of 0.6 mm and 1.2 mm.

At first, there will be described the condensing of the blue light beam and the detection of reflected light from the optical disc 1.

A blue light beam 24 emitted from a blue laser 17 as a blue light source is reflected by a beam splitter 19 and, then, reaches a collimating lens 21 mounted on a collimating lens actuator 7 which corresponds to a spherical-aberration correction actuator. Further, the collimating lens actuator 7 operates to correct spherical aberrations induced by the variation of the substrate thickness of the optical disc 1 and also operates to correct coma aberration, as will be described later in detail. Accordingly, the collimating lens actuator 7 includes the second coma-aberration correction actuator.

The light beam passed through the beam splitter 19 is linearly-polarized light and is changed in parallelism by the collimating lens 21. The light beam which has been changed in parallelism is folded, in optical axis, in a direction orthogonal to the optical disc 1 by an inclined surface of a mirror 22. The folded light beam passes through a λ/4 wave plate 32 to become circularly-polarized light. Thereafter, the light beam is converged on the information recording surface of the optical disc 1 intended for blue light through the blue-intended objective lens 4a, to form a light spot. In this case, the blue-intended objective lens 4a converges the blue light beam with a numerical aperture of 0.85, for example.

The converged light beam is reflected by the information recording surface of the optical disc 1 and enters the blue-intended objective lens 4a and reaches the λ/4 wave plate 32, again. The polarized light beam is converted, by the λ/4 wave plate 32, into linearly-polarized light which is orthogonal to the forward path (namely, the linearly-polarized light beam emitted from the collimating lens 21 to the mirror 22). Thereafter, the light beam which has been converted into the linearly-polarized light is reflected by the mirror 22, passes through the collimating lens 21 and enters to the beam splitter 19. The light beam in the backward path is reflected by the beam splitter 19 and enters to a photo detector 23 as an exemplary optical detector. The photo detector 23 performs photoelectric conversion on the light beam to produce electric signals for obtaining information signals and servo signals (focus error signals for the focusing control and tracking signals for the tracking control). The obtained electric signals are outputted to an objective-lens actuator drive circuit portion 16.

In this case, it is desirable that the collimating lens 21 is capable of converting divergent light into parallel light and, also, capable of adjusting the degree of parallelism thereof, and it is also possible to employ a combination of two lenses, which are concave and convex lenses. As will be described later, in moving the collimating lens 21 in the direction of its optical axis for adjusting the degree of parallelism in order to correct the spherical aberrations, in the case of constituting the collimating lens 21 by two lenses which are concave and concave lenses, it is necessary only to move one of these two lenses.

On the other hand, a red laser as the red light source is incorporated in a red unit 18a, and a red light beam 26 emitted from the red unit 18a is reflected by a wedge beam splitter 20, thereafter, is changed in parallelism by the collimating lens 21 (for example, into substantially-parallel light), and is directed to the mirror 22. The mirror 22 folds the optical axis thereof in the direction orthogonal to an optical disc 1 at its surface different from the surface which reflects the blue light beam 24 emitted from the blue laser 17. The red/infrared-intended objective lens 4b converges the light beam onto the information recording surface of the optical disc 1 intended for red light to form a light spot. In this case, the red/infrared-intended objective lens 4b converges the red light beam with a numerical aperture of 0.6, for example. The light beam reflected by the information recording surface of the optical disc 1 proceeds along the previous optical path in the opposite direction and is reflected by the wedge beam splitter 20 again, and enters to a photo detector as an exemplary optical detector incorporated in the red unit 18a. The entered light beam is subjected to photoelectric conversion by the photo detector in the red unit 18a, so that the photo detector in the red unit 18a produces electric signals for obtaining information signals and servo signals (focus error signals for the focusing control and tracking signals for the tracking control). The obtained electric signals are outputted to the objective-lens actuator drive circuit portion 16. The present embodiment employs the red unit 18a including the light source and the photo detector which are integrated with each other, which can reduce the size and the thickness of the optical pickup device and, also, can realize stability.

Further, an infrared laser as an infrared light source is incorporated in an infrared unit 18b, and an infrared light beam 25 emitted from the infrared unit 18b passes through the wedge beam splitter 20, then is changed in parallelism by the collimating lens 21 (for example, into substantially-parallel light), and is directed to the mirror 22. The mirror 22 folds the optical axis thereof in the direction orthogonal to an optical disc 1 at its surface different from the surface which reflects the blue light beam 24 emitted from the blue laser 17. In this case, the red/infrared-intended objective lens 4b converges the light beam on the information recording surface of the optical disc 1 intended for infrared light to form a light spot. In this case, the red/infrared objective lens 4b converges the infrared light beam with a numerical aperture of 0.45, for example. The light beam reflected by the information recording surface of the optical disc 1 proceeds along the previous optical path in the opposite direction, then passes through the wedge beam splitter 20 again, and enters to a photo detector as an exemplary optical detector incorporated in the infrared unit 18b. The entered light beam is subjected to photoelectric conversion by the photo detector in the infrared unit 18b, so that the photo detector in the infrared unit 18b creates electric signals for obtaining information signals and servo signals (focus error signals for the focusing control and tracking signals for the tracking control). The obtained electric signals are outputted to the objective-lens actuator drive circuit portion 16. The present embodiment employs the infrared laser unit 18b including the light source and the photo detector which are integrated with each other, which can reduce the size and the thickness of the optical head device and also can realize stability.

Figure 10:
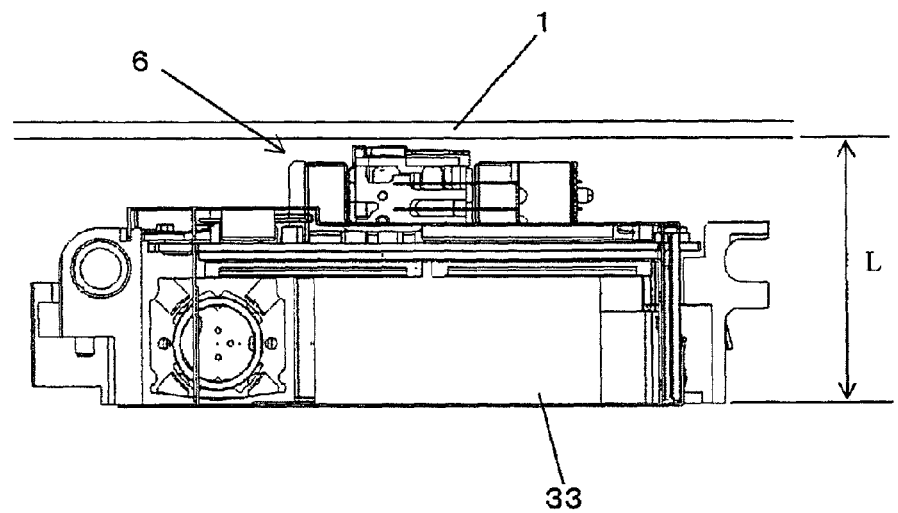
FIG. 10 is a front view illustrating the outward appearance of the optical pickup device according to the first embodiment of the present invention.

FIG. 10 illustrates the outward appearance of the optical pickup device 101 having the aforementioned structure. The aforementioned optical system is formed on an optical base 33. Assuming that a distance from the lower surface of the optical base 33 to the lower surface of the optical disc 1 is L, there is held the following expression.

L≦21 mm

Figure 4:
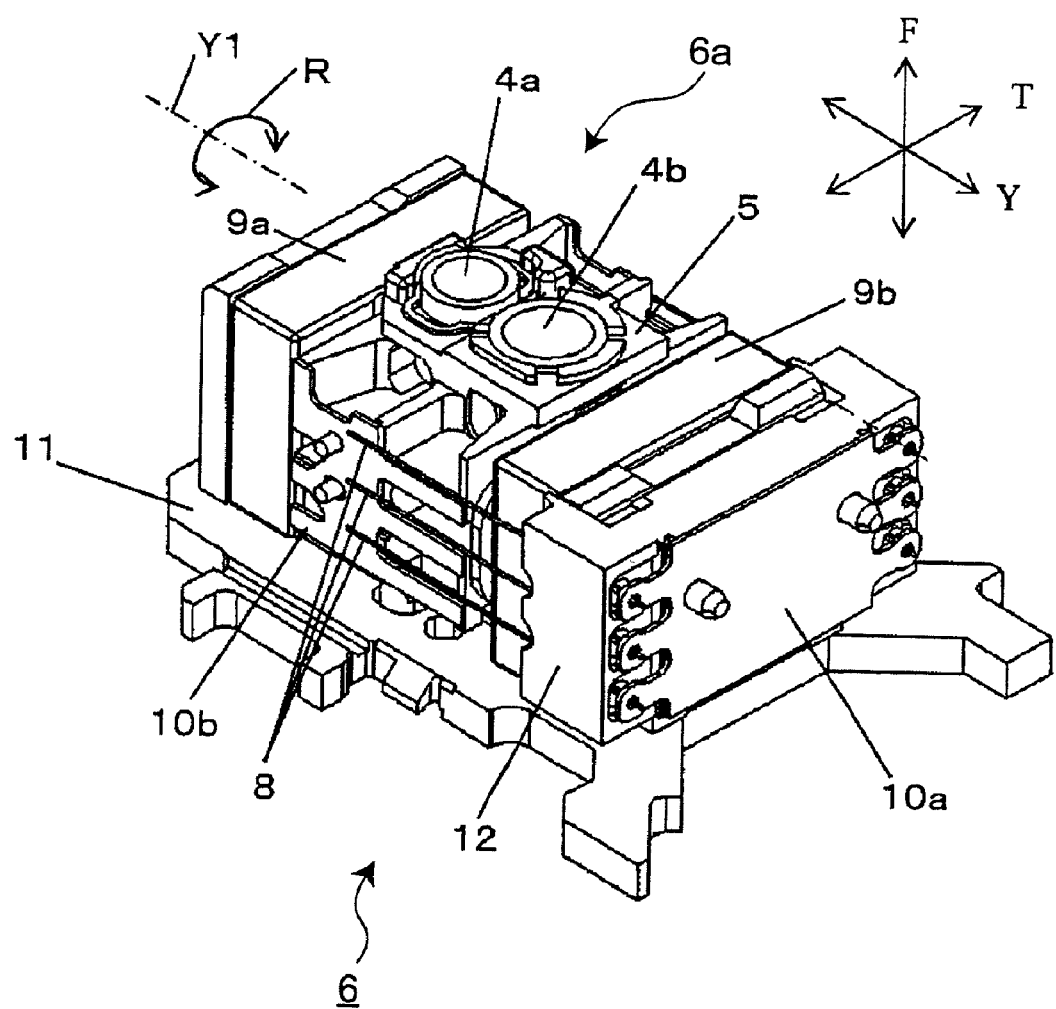
FIG. 4 is a perspective view illustrating the structure of an objective-lens actuator in the optical pickup device according to the first embodiment of the present invention.

In the aforementioned optical pickup device 101, the objective-lens actuator 6 drives the blue-intended objective lens 4a and the red/infrared-intended objective lens 4b in a focusing direction F, a tracking direction T and a radial tilt direction R for positioning them with respect to the optical disc 1, as illustrated in FIG. 4, for example. Further, the radial tilt direction R corresponds to the first tilt direction.

Further, the collimating lens actuator 7 moves the collimating lens 21 in the direction of the optical axis of the collimating lens 21, namely in a direction Y1 parallel with a tangential direction Y of the optical disc 1 in order to correct the spherical aberration induced by the variation and the like of the substrate thickness of the optical disc 1, at the focal point formed by the blue-intended objective lens 4a or the red/infrared-intended objective lens 4b.

Hereinafter, the objective lens actuator 6 will be described with reference to FIGS. 4 to 6.

As described above, F is the focusing direction, T is the tracking direction and Y is the tangential direction of the optical disc 1, and the focusing direction F, the tracking direction T and the tangential direction Y are directions which are orthogonal to one another and correspond to the directions of the respective coordinate axes of three-dimensional Cartesian coordinates.

Further, R is the radial tilt direction in a rotational direction about a rotational axis Y1 parallel with the tangential direction Y.

"5" designates a lens holder made of a shaped resin, and the red/infrared-intended objective lens 4b and the blue-intended objective lens 9a are mounted in the lens holder 5 such that they are adjacent to each other. In the lens holder 5, focusing coils 2a to 2d and tracking coils 3a and 3b are mounted on the two side surfaces in the tangential direction Y, and terminal plates 10b are mounted on the two side surfaces in the tracking direction T. Accordingly, the red/infrared-intended objective lens 4b, the blue-intended objective lens 4a, the lens holder 5, the focusing coils 2a to 2d and the tracking coils 3a and 3b constitute a movable member 6a.

Further, the focusing coils 2a to 2d correspond to an example of the first tilt drive portion.

Terminals of the focusing coils 2a and 2c electrically connected to each other and terminals of the focusing coils 2b and 2d electrically connected to each other are wired to the objective-lens actuator drive circuit portion 16 (FIG. 1) as a control circuit, independently of each other, through the terminal plates 10b, wires 8 and a substrate 10a.

Further, the tracking coil 3a and the tracking coil 3b are wired to each other in series and are wired to the objective-lens actuator drive circuit portion 16 (FIG. 1) through the terminal plates 10b, the wires 8 and the substrate 10a.

"9a" designates a first magnet, and "9b" designates a second magnet, and both of them have been subjected to multi-pole magnetization at the areas bounded by magnetization boundary lines corresponding to the focusing coils 2a to 2d and the tracking coils 3a and 3b and, also, are secured to a yoke base 11.

The wires 8 are secured at their base ends to the substrate 10a by being passed through a suspension holder 12. Further, the suspension holder 12 and the substrate 10a are secured to the yoke base 11. The wires 8 are made of an elastic metal material such as beryllium copper or phosphor bronze and are formed from a wire material or a rod material with a circular, substantially-polygonal, elliptical cross-sectional shape or other cross-sectional shapes. Further, the support centers of the wires 8 are set to be substantially coincident with the center of gravity of the movable member 6a.

The red/infrared-intended objective lens 4b and the blue-intended objective lens 4a are arranged on the lens holder 5 along the tangential direction Y. The red/infrared-intended objective lens 4b is disposed at a position closer to the base ends of the wires 8 than the support centers of the wires 8 which are supported by the terminal plates 10b, while the blue-intended objective lens 4a is disposed at a position closer to the tip ends of the wires 8 than the support centers of the wires 8.

Figure 6:
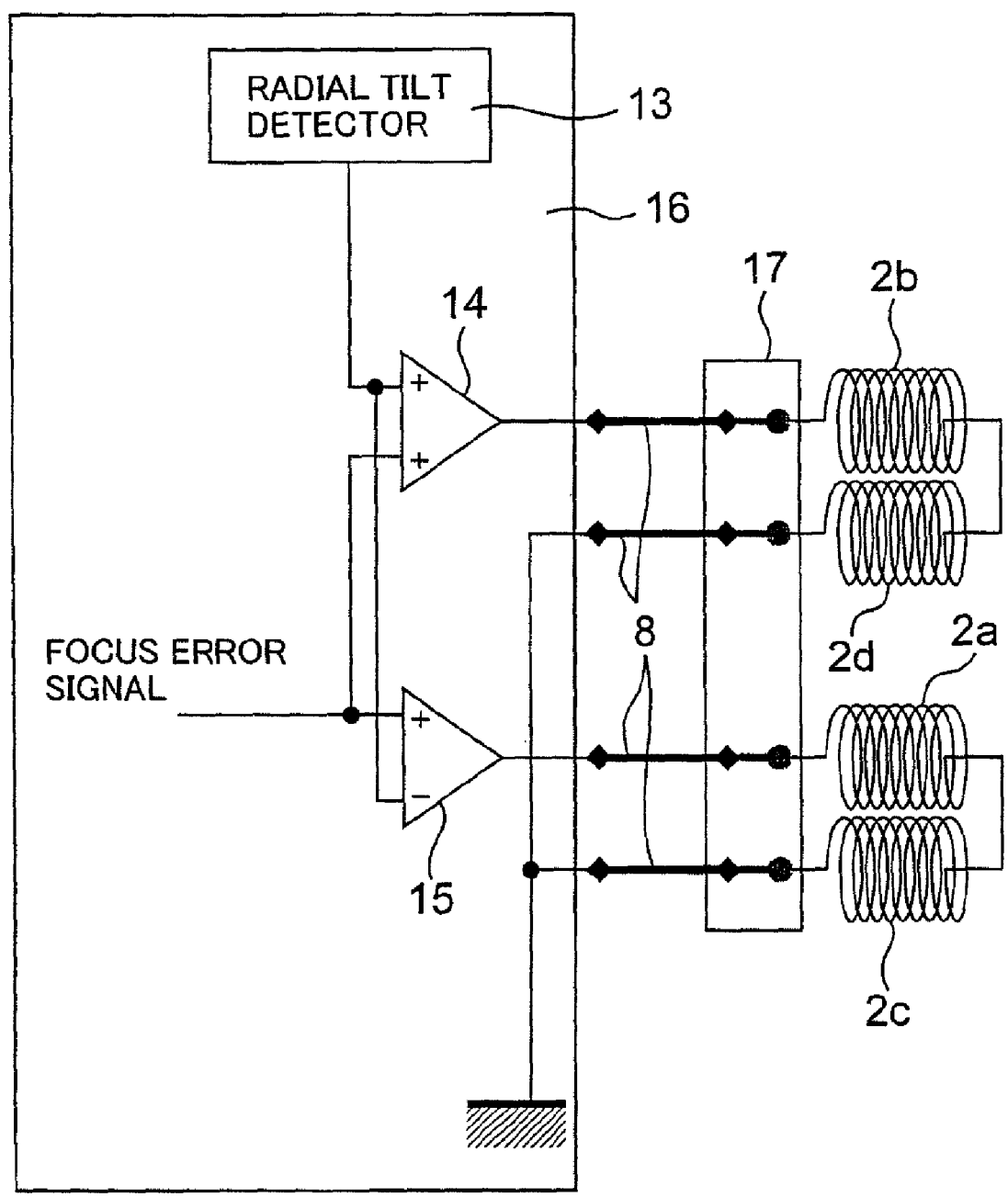
FIG. 6 is a circuit diagram illustrating the structure of a radial tilt drive circuit in the objective-lens actuator in the optical pickup device according to the first embodiment of the present invention.

Next, referring to FIG. 6, "13" designates a radial tilt detector which generates tilt error signals, on detecting a relative error of the angle of the optical disc 1 with respect to the optical axis of the blue-intended objective lens 4a or the red/infrared-intended objective lens 4b in a radial direction R. "14" designates an adder which sums the radial tilt error signal and the focus error signal indicative of error of the distance from the optical disc 1 to the blue-intended objective lens 4a or the red/infrared-intended objective lens 4b, which are outputted from the objective-lens actuator drive circuit portion 16. "15" designates a subtractor which subtracts the tilt error signal from the focus error signal. The radial tilt detector 13, the adder 14, the subtractor 15 and a focusing detector constitute the objective-lens actuator drive circuit portion 16. The objective-lens actuator drive circuit portion 16 is housed in the optical pickup device of FIG. 1 or in an optical disc device incorporating the optical pickup device.

In this case, the radial tilt detector 13 can be adapted to detect the radial tilt, by a reflection-type optical sensor mounted on the movable member, for example. In this case, it is necessary to supply electricity to the optical sensor through the wires 8 or to connect an additional electricity-supply wire to the optical sensor. Also, it is not necessarily necessary to directly detect the relative angle between the disc and the optical axis of the blue-intended objective lens 4*a* or the red/infrared-intended objective lens 4*b*, and it is also possible to create a tilt error signal based on detected numerical values relating to the amount of tilt. For example, it is possible to detect the value of jitter in playback signals during playback of data from the optical disc 1 and to output, as the tilt error signal, such signal that minimizes the detected value of jitter. Also, it is possible to create the tilt error signal by the amount of tilt calculated based on an amount of the radial coma aberration measured during the assembling process of the optical pickup device.

Next, with reference to FIGS. 4 to 6, there will be described operations of the objective-lens actuator 6 having the aforementioned structure.

At first, in an operation for driving the movable member 6*a* in the focusing direction, the focus error signal is outputted from any of the photo detector 23 and the photo detectors in the red unit 18*a* and the infrared unit 18*b* according to the type of the optical disc 1 being loaded in the optical disc device, then the adder 14 and the subtractor 15 input the focus error signals to the focusing coils 2*a* and 2*c* and the focusing coils 2*b* and 2*d*, respectively. This induces electromagnetic forces in the focusing direction F between the respective magnetic fluxes generated from the first and second magnets 9*a* and 9*b* and the electric currents as the focus error signal flowing through the focusing coils 2*a* and 2*c* and the focusing coils 2*b* and 2*d*, so that the movable member 6*a* performs substantially translational motion in the focusing direction F while being supported by the wires 8. Thus, the movable member 6*a* is driven in the focusing direction F.

Next, in an operation for driving the movable member 6*a* in the tracking direction T, the tracking error signal (not illustrated) is outputted from any of the photo detector 23 and the photo detectors in the red unit 18*a* and the infrared unit 18*b* according to the type of the optical disc 1 being loaded in the optical disc device, then the tracking error signal is inputted to the tracking coil 3*a* and the tracking coil 3*b*, respectively. This induces electromagnetic forces in the tracking direction T between the respective magnetic fluxes generated from the first and second magnets 9*a* and 9*b* and the electric currents as the tracking error signal flowing through the tracking coil 3*a* and the tracking coil 3*b*. Consequently, the movable member 6*a* performs substantially translational motion in the tracking direction T while being supported by the wires 8. Thus, the movable member 6*a* is driven in the tracking direction T.

Next, in an operation for driving the movable member 6*a* in the radial tilt direction R, the radial tilt detector 13 outputs the radial tilt error signal according to the relative error of the angle of the optical disc 1 with respect to the optical axis of the blue-intended objective lens 4*a* or the red/infrared-intended objective lens 4*b* in the radial direction. On receiving the output, the adder 14 adds the outputted radial tilt error signal to the focus error signal and inputs the signal resulted from the addition to the focusing coils 2*a* and 2*c*. On the other hand, on receiving the outputted radial tilt error signal, the subtractor 15 subtracts the outputted radial tilt error signal from the focus error signal and inputs the signal resulted from the subtraction to the focusing coils 2*b* and 2*d*. This induces a difference corresponding to the radial tilt error signal, between the electromagnetic force in the focusing direction F which is generated from the focusing coils 2*a* and 2*c* and the electromagnetic force in the focusing direction F which is generated from the focusing coils 2*b* and 2*d*. Since the focusing coils 2*a* and 2*c* and the focusing coils 2*b* and 2*d* are placed at positions spaced apart from each other in the opposite directions by the same distance about a plane which is perpendicular to the tracking direction T and contains the optical axis of the blue-intended objective lens 4*a* or the red/infrared-intended objective lens 4*b*, the movable member 6*a* is subjected to the electromagnetic forces having the aforementioned difference induced therebetween, so that a moment corresponding to the radial tilt signal acts on the movable member 6*a*. Consequently, the movable member 6*a* rotates in the radial tilt direction R about a support. This rotation corrects the angular deviation, namely the coma aberration in the radial direction, between the optical disc 1 and the optical axis of the blue-intended objective lens 4*a* or the red/infrared-intended objective lens 4*b*.

Figure 5:
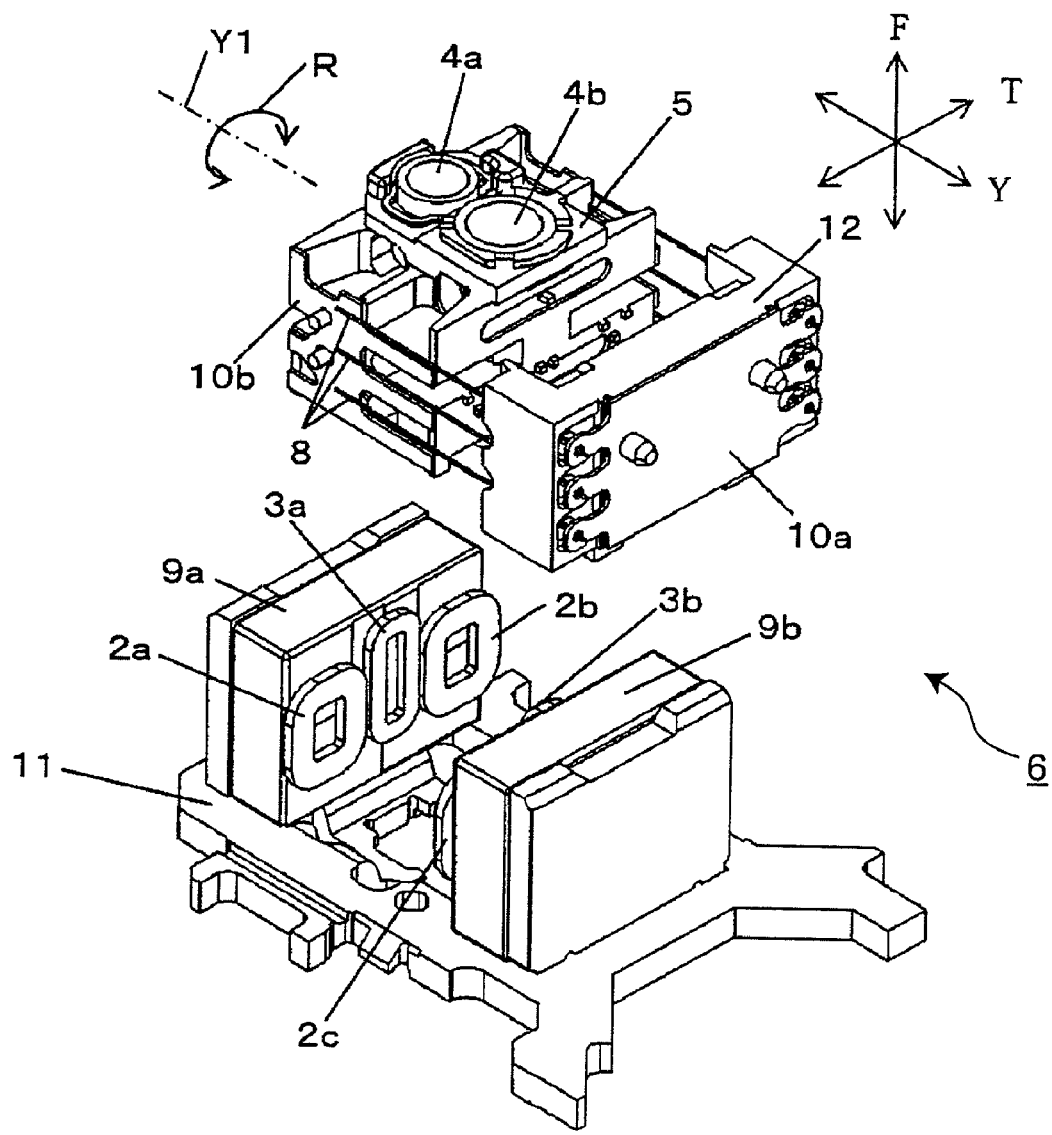
FIG. 5 is an exploded perspective view illustrating the structure of the objective-lens actuator in the optical pickup device according to the first embodiment of the present invention.

Further, as can be clearly seen from FIG. 4 and FIG. 5 and the aforementioned description, in the present embodiment, the blue-intended objective lens 4*a* and the red/infrared-intended objective lens 4*b* are mounted in the single movable member 6*a*, and the respective objective lenses 4*a* and 4*b* are not structured to be individually rotated and driven in the radial tilt direction R independently of each other. For example, when a BD-intended optical disc 1 is loaded, and the blue-intended objective lens 4*a* is used, the objective lens 4*a* is rotated and driven in the radial tilt direction R by an angle which can correct the coma aberration in the radial direction and, at this time, the objective lens 4*b* is also rotated and driven in the radial tilt direction R by the same angle.

Further, in a case where the radial tilt error signal is created as the amount of tilt calculated based on amount of radial coma aberration determined during the assembling process of the optical pickup device, it is possible to correct aberrations induced in the optical system beyond the coma-aberration degradation induced by the tilt, as a result of the correction of the tilt based on the radial tilt error signal as described above.

Next, with reference to FIG. 2 and FIG. 3, the collimating lens actuator 7 will be described.

A direction S is a tangential tilt direction which is a rotational direction about an axis T1 parallel with the tracking direction T. Further, as illustrated in FIG. 2, the axis T1 is the center axis passing through the center of the collimating lens 21 along the direction of a diameter and also is the rotational axis about which the collimating lens 21 is rotated in the tangential tilt direction S. Accordingly, in the present specification, the axis T1 is referred to as a tangential tilt rotational axis.

"51" designates a carriage made of a shaped resin, and the carriage 51 is supported by a main shaft 52 and a sub shaft 53 secured to a base 59 such that the carriage 51 is movable in the tangential direction Y. On the other hand, a stepping motor 58 is placed on the base 59 such that the rotational driving force from the stepping motor 58 is transmitted to a screw 55 through a motor gear 57 and a screw gear 56. A nut 54 fitted to the carriage 51 is engaged with a thread portion of the screw 55 and is placed such that the rotation of the screw 55 is converted into translational movement of the carriage 51.

The collimating lens 21 is held on one side of a suspension flat spring 61 which corresponds to an exemplary elastic support member, and the other side of the suspension flat spring 61 is secured to the carriage 51. Accordingly, the collimating lens 21 is supported at its opposite ends by the suspension flat spring 61, in a state where the collimating lens 21 is rotatable with respect to the carriage 51 in the tangential tilt direction S which is the rotational direction about the axis T1 parallel with the tracking direction T. Further, the tangential tilt direction S corresponds to the second tilt direction.

Further, two movable magnets 62 are installed on the collimating lens 21, and two fixed tangential tilt coils 63 are set on the carriage 51 at the positions which are faced to the two movable magnets 62. The movable magnet 62 and the fixed tangential tilt coil 63 constitute a tangential tilt drive portion. The tangential tilt drive portions are placed at the positions which form an angle of about 45 degrees with the axis T1 and are above the axis T1 which is the tangential tilt rotational axis, namely closer to the optical disc 1 in the direction of the thickness of the loaded optical disc 1.

Further, the tangential tilt drive portion corresponds to an example of the second tilt drive portion. Further, a structural portion constituted by the movable magnets 62 and the fixed tangential tilt coils 63, which constitute the tangential tilt drive portions, plus the suspension flat spring 61 corresponds to an example of the second coma-aberration correction actuator.

Figure 3:
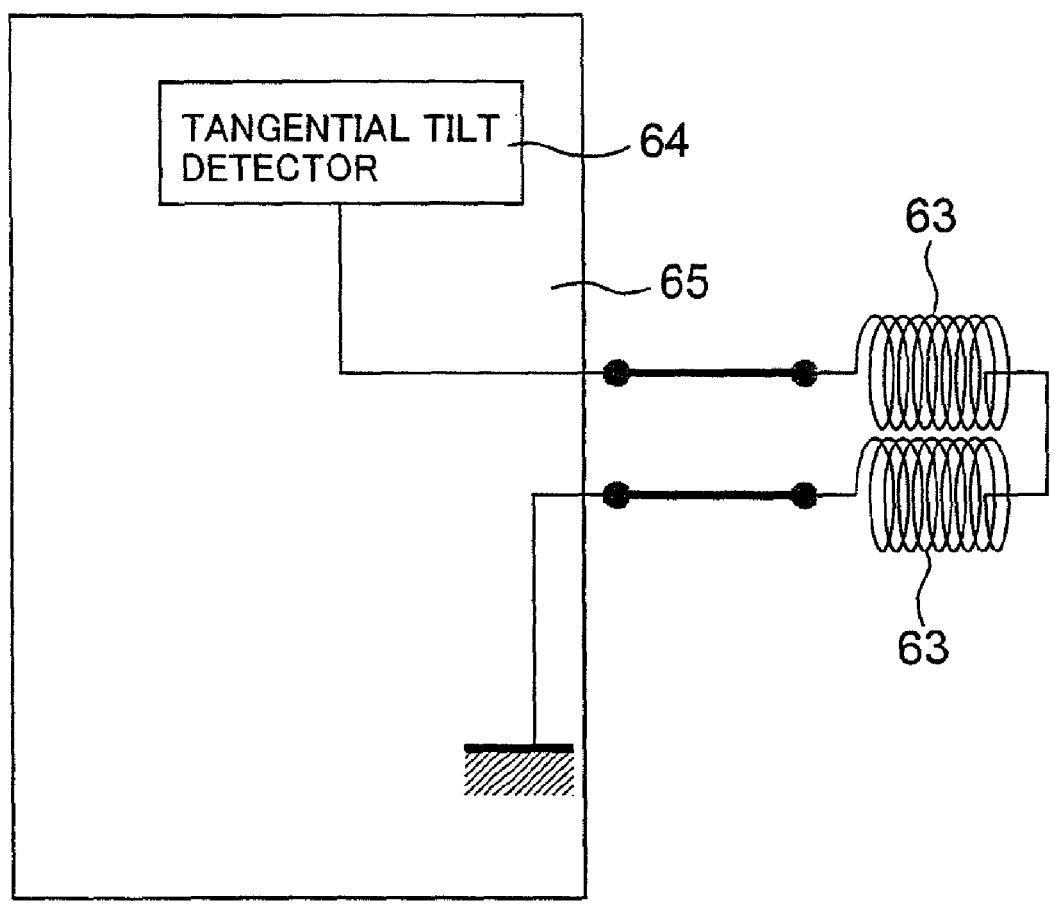
FIG. 3 is a circuit diagram illustrating the structure of a tangential tilt drive circuit in the collimating lens actuator in the optical pickup device according to the first embodiment of the present invention.

Next, referring to FIG. 3, "64" designates a tangential tilt detector which generates tilt error signal, on detecting relative error of the angle of the optical disc 1 with respect to the optical axis of the blue-intended objective lens 4a or the red/infrared-intended objective lens 4b in the tangential tilt direction S. The tangential tilt detector 64 constitutes a tangential tilt drive circuit portion 65. The tangential tilt drive circuit portion 65 is housed in the optical pickup device 101 of FIG. 1 or in the optical disc device incorporating the optical pickup device 101.

In this case, the tangential tilt detector 64 can be adapted to detect the tangential tilt by installing a reflection-type optical sensor on the movable member, for example. Also, it is not necessarily necessary to directly detect the relative angle of the disc with respect to the optical axis of the blue-intended objective lens 4a or the red/infrared-intended objective lens 4b, and it is possible to create the tilt error signal based on detected numerical values relating to the amount of tilt. For example, it is possible to detect a value of jitter in the playback signal during playback of data from the optical disc 1 and to output the detected value of jitter, as the tilt error signal. Also, it is possible to create the tilt error signal by using amounts of tilt calculated based on the tangential coma aberration measured during the assembling process of the optical pickup device.

In this case, the collimating lens actuator 7 is structured to correct the coma aberration in the tangential tilt direction S only and, therefore, it is necessary only that the collimating lens 21 is supported such that it is rotatable only in a single axial direction. Accordingly, the tangential tilt drive portion can be structured to include the single simple elastic spring, which can reduce the component cost and can enhance the ease of assemble. Further, since the tangential tilt drive portion is structured to include the single elastic spring, it is possible to realize excellent linearity between the displacement of the collimating lens 21 and the driving force for the collimating lens 21, thereby improving the resolution for tilt control. Further, it is possible to ensure stabilized characteristics against the temperature change and time-dependent changes.

Next, with reference to FIG. 2, there will be described operations of the collimating lens actuator 7 having the aforementioned structure.

At first, in an operation for driving the carriage 51 in the tangential direction Y, when a step signal corresponding to the amount of to-be-corrected spherical aberration is applied to the stepping motor 58, the stepping motor 58 rotates according to the number of steps, which is converted into translational motion through the motor gear 57, the screw gear 56, the screw 55 and the nut 54. Accordingly, the carriage 51 is driven in the tangential direction Y by a distance corresponding to a predetermined number of steps.

It is not necessarily necessary to directly detect the spherical aberration as the amount of to-be-corrected spherical aberration, and by detecting numerical values relating to the spherical aberration, it is also possible to create step signals corresponding to amounts of to-be-corrected spherical aberrations, based on the detected numerical values. For example, it is possible to detect a value of jitter in the playback signal during playback of data from the optical disc 1 and to output step signal which minimizes the detected value of jitter. Also, it is possible to output step signal calculated based on an amount of to-be-corrected spherical aberration determined during the assembling process of the optical pickup device.

Next, in an operation for driving the movable member in the tangential tilt direction S, the tangential tilt detector 64 outputs tangential tilt error signal, according to relative error of the angle of the optical disc 1 with respect to the optical axis of the blue-intended objective lens 4a or the red/infrared-intended objective lens 4b in the tangential tilt direction S. The tangential tilt error signal is applied to the fixed tangential tilt coils 63, which induces electromagnetic force in the tangential tilt direction S between the magnetic fluxes generated from the movable magnets 62 and the electric currents, as the tangential tilt error signal, flowing through the fixed tangential coils 63. Consequently, the collimating lens 21 is driven to perform an inclining operation in the tangential tilt direction S while being supported by the suspension flat spring 61. This results in correction of the coma aberration in the tangential direction which has been induced by the angular deviation of the optical disc 1 from the optical axis of the blue-intended objective lens 4a or the red/infrared-intended objective lens 4b.

Further, in a case where an amount of tilt calculated based on an amount of the tangential coma aberration determined during the assembling process of the optical pickup device are created as tangential tilt error signals, it is possible to correct aberrations induced in the optical system beyond the coma-aberration degradation induced by the tilt, as a result of the correction of the tilt based on the tangential tilt error signal as described above.

Further, it is possible to change the inclination angle of the collimating lens 21 mounted on the carriage 51 according to the position of the carriage 51 in the tangential direction Y. This enables optimization of the amount of coma-aberration correction generated depending on the position of the collimating lens 21, thereby further improving the quality of record/playback signals in the optical pickup device.

Hereinafter, there will be described, in detail, a structure of the collimating lens 21 applicable to the optical pickup according to the present embodiment.

The collimating lens 21 according to the present embodiment is largely different from conventional collimating lenses in terms of off-axis coma-aberration performance. Namely, in the collimating lens, the off-axis incidence of the optical axis may occur, due to the decentering of the collimating lens which is induced during movement of the collimating lens actuator in the direction of the optical axis, because of the positional deviation of the light source, the outer-shape tolerance of the lens itself, the decentering of the lens induced when mounting thereof to the carriage and, further, mounting errors (inclination) of at least one of the main shaft and the sub shaft for moving the carriage. Therefore, conventional collimating lenses are designed such that, even if the off-axis incidence occurs, this induces no coma aberration. Accordingly, even if a conventional collimating lens is inclined with respect to the optical axis, substantially no coma aberration occurs.

Such conventional collimating lenses are formed to have convex shapes at their opposite surfaces or a flat surface at one side and a convex surface at the other side and, therefore, are not formed to have a meniscus shape.

On the other hand, the collimating lens 21 according to the present embodiment is largely different from conventional collimating lenses, in that a large coma aberration is induced by the off-axis incidence, namely, if the collimating lens is inclined with respect to the optical axis, this induces a large coma aberration.

Figure 7:
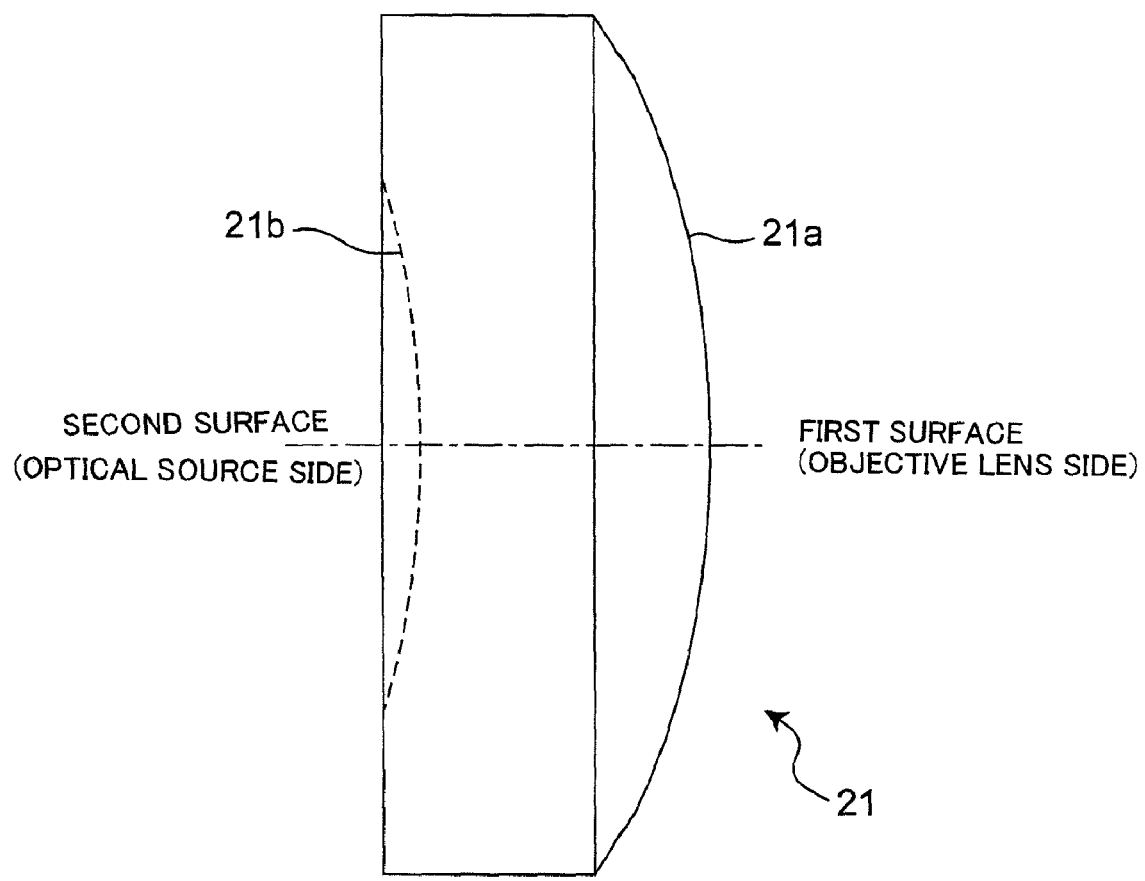
FIG. 7 is a front view illustrating the shape of the collimating lens 21 in the optical pickup device according to the first embodiment of the present invention.

To describe in detail, FIG. 7 is a front view illustrating the shape of the collimating lens 21 and, as illustrated in FIG. 7, the collimating lens 21 according to the present embodiment has a meniscus shape having a first surface 21a (closer to the objective lens) which is convex and a second surface 21b (closer to the light source) which is concave. The collimating lens 21 is designed such that, if it is inclined with respect to the optical axis, this induces third-order coma aberration. Further, as can be clearly seen from the following "Table 1", assuming that an absolute value of a paraxial radius of curvature of the first surface 21a of the collimating lens 21 is r1, and an absolute value of a paraxial radius of curvature of the second surface 21b is r2, there is satisfied a relationship r1<r2, and at least one of the first surface 21a and the second surface 21b has an aspherical surface shape.

"Table 1" represents specifications of the collimating lens 21.

TABLE 1

Specifications of Collimating lens

| Wavelength | 408 nm | |
| Refractive Index | 1.5225 | |
| Focal length | 15.78 mm | |
| | First Surface | Second Surface |
| Radius of Curvature r | 2.857 | 3.846 |
| Constant of the Cone k | −0.654 | −0.966 |
| Thickness | 1.0 mm | |

In "Table 1", "First Surface" refers to the surface closer to the blue-intended objective lens 4a, and "Second Surface" refers to the surface closer to the light source 17. The first surface 21a and the second surface 21b have aspherical surface shapes determined by the aspherical surface shapes expressed by the following "Equation 1". In this case, h is a distance from the apex on the optical axis to a position in the direction orthogonal to the optical axis.

$$Z = \frac{h^2/r}{1+\sqrt{1-(1+k)(h/r)^2}} \quad \text{[Equation 1]}$$

In "Equation 1", Z is a distance (sag) in the direction of the optical axis from the tangent plane at the apex, which is determined by h, r and k, and the curvature determined by the value of Z provides the aspherical surface cross-sectional shape of each surface.

Next, "Table 2" represents specifications of the objective lens 4a according to the present embodiment. The objective lens 4a is an objective lens intended for optical discs with substrate thicknesses in the range of 0.075 mm to 0.1 mm and is designed to induce a third-order spherical aberration of zero for a substrate thickness of 0.085 mm.

TABLE 2

Specifications of Objective Lens

| Wavelength | 408 nm |
| Numerical Aperture | 0.85 |
| Focal Length | 1.3 mm |
| Aperture Diameter | 2.21 mm |
| Thickness of Protective Layer | 0.085 mm |

Hereinafter, there will be described, in detail, characteristics of the optical pickup device in a state that the collimating lens 21 according to the present embodiment is combined with the blue-intended objective lens 4a, when a light spot is converged on the information recording surface of an optical disc 1 with the substrate thickness of 0.085 mm.

Figure 8A:
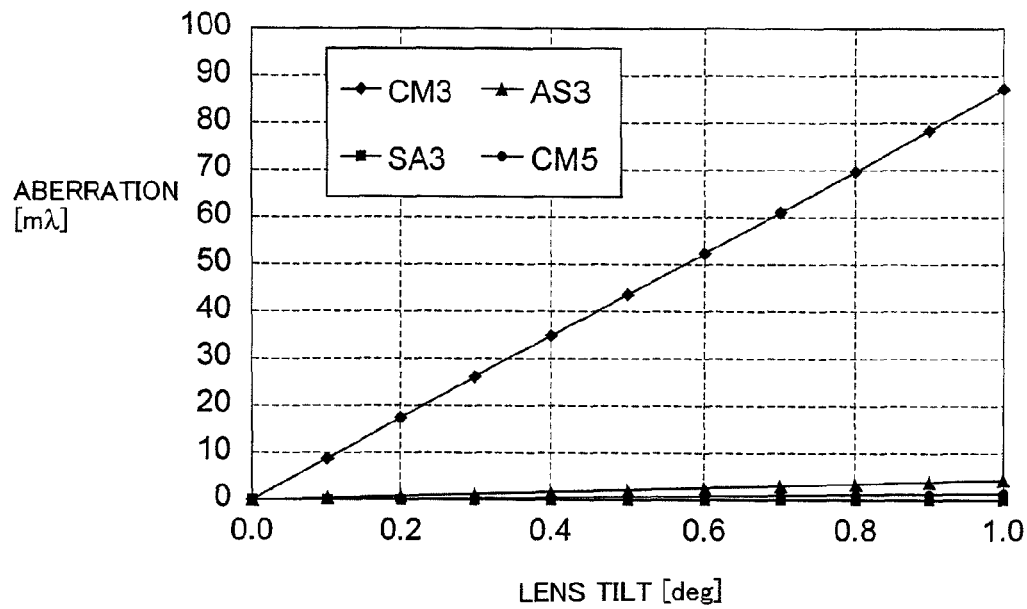
FIG. 8A is a graph illustrating the lens tilt angle when the collimating lens is inclined with respect to the optical axis along the horizontal axis and illustrating the amount of induced aberration along the vertical axis, in the optical pickup device according to the first embodiment of the present invention.

FIG. 8A is a graph illustrating the lens tilt angle along the horizontal axis and illustrating the amount of induced aberration along the vertical axis, when the collimating lens 21 is inclined with respect to the optical axis. In the figure, CM3 refers to the third-order coma aberration, AS3 refers to the third-order astigmatism, SA3 refers to the third-order spherical aberration, and CM5 refers to the fifth-order coma aberration (hereinafter, the same will be applied). FIG. 8A shows that, if the collimating lens 21 according to the present embodiment is inclined by 0.5 deg with respect to the optical axis, this induces a third-order coma aberration of about 43 mλ while inducing substantially no other aberrations.

Figure 8B:
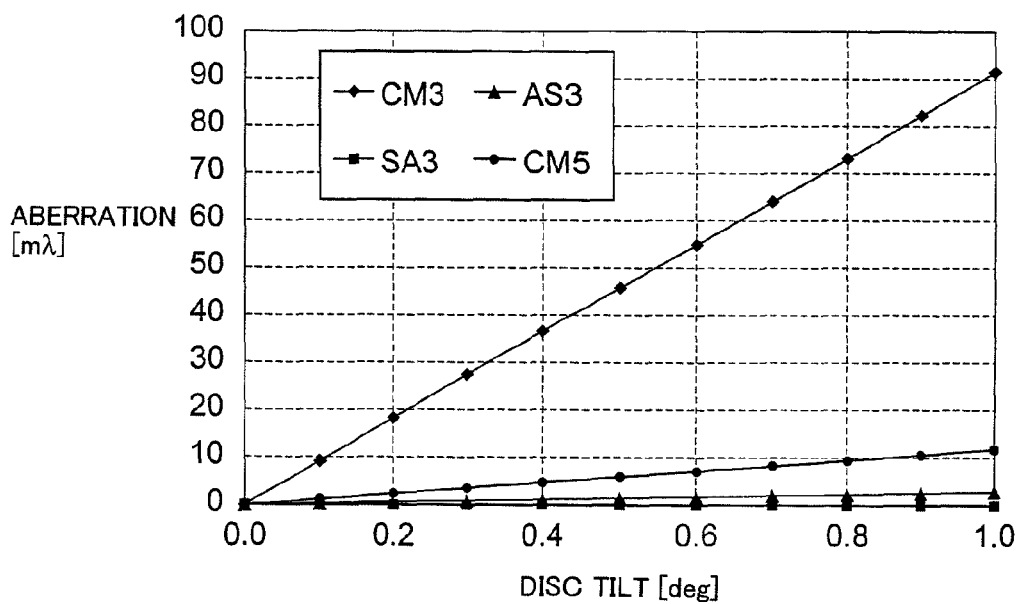
FIG. 8B is a graph illustrating the inclination of an optical disc, namely the disc tilt angle, along the horizontal axis, and illustrating the amount of induced aberration along the vertical axis, in the optical pickup device according to the first embodiment of the present invention.

On the other hand, FIG. 8B is a graph illustrating the inclination of the optical disc, namely the disc tilt angle, along the horizontal axis, and illustrating the amount of induced aberration along the vertical axis. FIG. 8B shows that, if the optical disc 1 is inclined by 0.5 deg, this induces a third-order coma aberration of about 45 mλ.

Namely, when there is a disc tilt of a predetermined angle, if the collimating lens 21 according to the present embodiment is caused to form a lens tilt angle substantially equal to the disc tilt angle, it is possible to preferably correct the third-order coma aberration.

Further, it is clear that third-order coma aberrations to be corrected by the collimating lens 21 can be third-order coma aberrations induced in other optical systems, as well as the third-order coma aberration induced by the disc tilt. For example, it is preferable to cause the lens tilt of the collimating lens 21 according to the present embodiment, in order to correct third-order coma aberration which is left in the blue-intended objective lens 4a in shaping the blue-intended objective lens 4a, and third-order coma aberration induced by the inclination of the lens in mounting the blue-intended objective lens 4a to the optical head.

On the other hand, the optical pickup device 101 according to the present embodiment includes the mechanism for moving the collimating lens 21 in the direction of the optical axis, in order to correct third-order spherical aberrations induced by the variation of the substrate thicknesses of the information recording surfaces of optical discs 1.

Figure 9A:
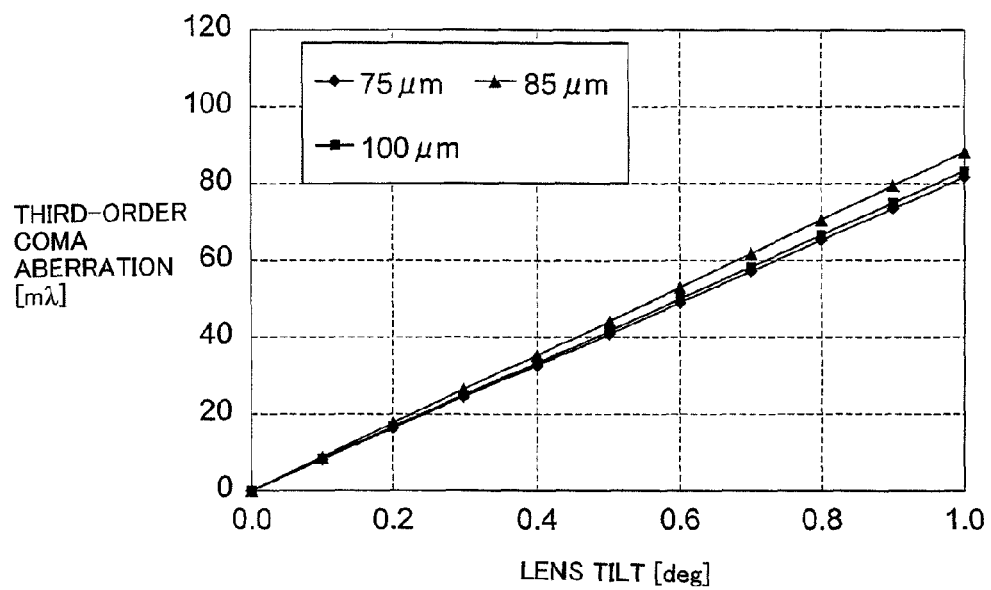
FIG. 9A is a view illustrating a relationship between the lens tilt angle of the collimating lens and the amount of induced third-order coma aberration, when the collimating lens is moved to a predetermined position in the direction of the optical axis in order to correct third-order spherical aberrations of the respective information recording surfaces having different substrate thicknesses (75 micrometers, 85 micrometers, and 100 micrometers), in the optical pickup device according to the first embodiment of the present invention.
Figure 9B:
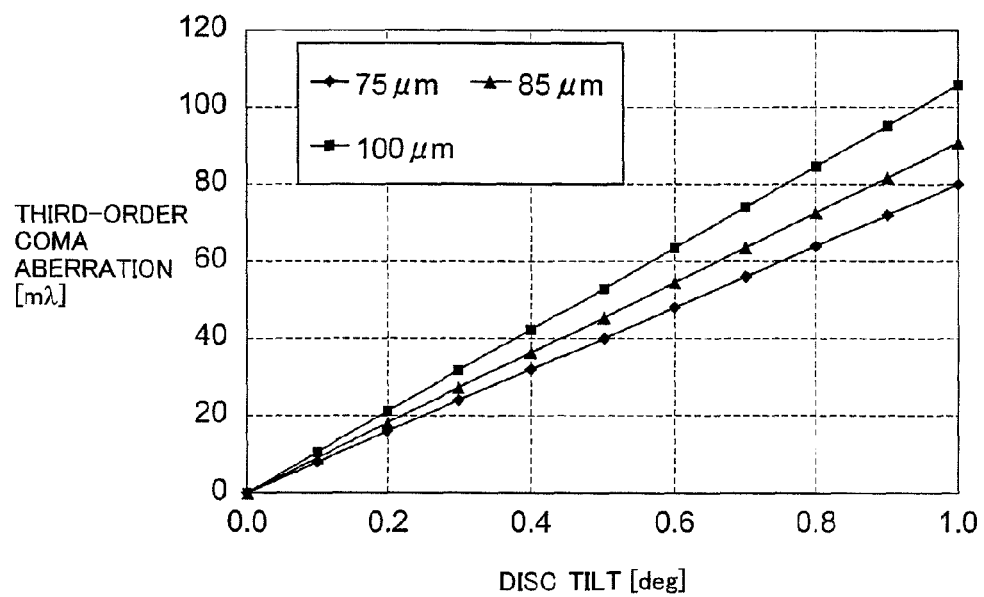
FIG. 9B is a view illustrating a relationship between the disc tilt angle and the amount of induced third-order coma aberration, when the collimating lens is moved to a predetermined position in the direction of the optical axis in order to correct third-order spherical aberrations of respective information recording surfaces having different substrate thicknesses (75 micrometers, 85 micrometers, and 100 micrometers), in the optical pickup device according to the first embodiment of the present invention.

FIG. 9A is a view illustrating a relationship between the lens tilt angle of the collimating lens 21 and the amount of induced third-order coma aberration, when the collimating lens 21 is moved to a predetermined position in the direction of the optical axis, in order to correct third-order spherical aberrations of respective information recording surfaces having different substrate thicknesses (75 micrometers, 85 micrometers, and 100 micrometers). The horizontal axis represents the lens tilt angle in a case where the collimating lens 21 is inclined with respect to the optical axis, while the vertical axis represents the amount of induced third-order coma aberration.

As can be clearly seen from FIG. 9A, even if the position of the collimating lens 21 in the direction of the optical axis is changed according to the substrate thickness of the information recording surface, the amount of third-order coma aberration is hardly changed. Namely, provided that the amount of to-be-corrected coma aberration is constant, even if the collimating lens 21 is moved to a predetermined position in the direction of the optical axis corresponding to the respective information recording surfaces, it is substantially unnecessary to change the lens tilt angle of the collimating lens 21.

In this case, if there is amounting error (inclination) in at least one of the main shaft and the sub shaft for moving the carriage for moving the collimating lens 21 in the direction of the optical axis, the off-axis incidence is induced when the collimating lens 21 is moved in the direction of the optical axis, thereby inducing a coma aberration, as described above. However, such a coma aberration can be also corrected, by the objective-lens actuator 6 for inclining the objective lenses 4a and 4b in the radial tilt direction R and by the collimating lens actuator 7 for inclining the collimating lens 21 in the tangential tilt direction S.

FIG. 93 is a view illustrating a relationship between the disc tilt angle and the amount of induced third-order coma aberration, when the collimating lens 21 is moved to a predetermined position in the direction of the optical axis in order to correct third-order spherical aberrations of respective information recording surfaces having different substrate thicknesses (75 micrometers, 85 micrometers, and 100 micrometers). The horizontal axis represents the inclination of the optical disc (the disc tilt), and the vertical axis represents the amount of induced third-order coma aberration.

It can be understood that the amount of third-order coma aberration is changed according to the substrate thickness of the information recording surface, since the amount of third-order coma aberration is proportional to the disc tilt angle and the substrate thickness.

Accordingly, when there is a large third-order coma aberration induced by a predetermined disc tilt, it is preferable to change the lens tilt angle of the collimating lens 21, according to the substrate thickness of the information recording surface, namely, according to the position of the collimating lens 21 in the direction of the optical axis.

There has been described, in the present embodiment, the structure capable of correcting third-order coma aberration induced by the disc tilt, by inclining the collimating lens 21 with respect to the optical axis by an angle substantially equal to the disc tilt angle. However, the present invention is not limited to the aforementioned structure, and it is possible to arbitrarily set the amount of third-order coma aberration induced by inclining the collimating lens with respect to the optical axis.

For example, by making the amounts of third-order coma aberrations induced by predetermined lens tilts of the objective lenses 4a and 4b, that is, for example, the amounts of third-order coma aberrations per unit angle, larger than the amounts of coma aberrations to be corrected by the collimating lens 21 according to the present embodiment, it is possible to correct third-order coma aberration with smaller lens tilts of the collimating lens 21.

On the other hand, by making the amounts of third-order coma aberrations induced by predetermined lens tilts of the objective lenses 4a and 4b smaller than the amounts of coma aberrations to be corrected by the collimating lens 21 according to the present embodiment, it is possible to increase the resolution for correction of third-order coma aberrations.

For example, the minimum inclination angle of the collimating lens 21 is about 0.1 deg in view of the controlling performance of the collimating lens actuator 21, and the maximum inclination angle of the collimating lens 21 is about 2.0 deg in view of ensuring the optical performance. Further, a maximum amount of to-be-corrected third-order coma aberration is about 100 mλ. On the other hand, it is substantially unnecessary to correct third-order coma aberrations in amounts less than 20 mλ. Accordingly, the amounts of coma aberrations induced by predetermined tilts of the collimating lens 21 fall within the range of 10 mλ/deg to 1000 mλ/deg.

This collimating lens is required to satisfy a condition $-0.0015 > SC > -0.2$, assuming that the height of the position farthest from the optical axis is h (=½ of the aperture diameter), the angle which the light ray passed through the position at the height h forms with the optical axis is θ, the focal length of the collimating lens is f, and an offense against a sine condition SC is defined as $SC = h/(f \cdot \sin\theta) - 1$. To epitomize this condition, the collimating lens should be a lens having a concave surface at its one side and a convex surface at the other side. For example, the collimating lens 21 according to the present embodiment represented in "Table 1" satisfies a condition $SC = -0.0176$. Further, collimating lenses used in conventional optical pickup devices have SCs of approximately 0.

Further, the specifications of the collimating lens 21 according to the present embodiment are not limited to those illustrated in "Table 1" and, also, the shape thereof is not limited to the meniscus shape illustrated in FIG. 7. It is clear that, even in a case of other shapes such as biconvex shapes, provided that the collimating lens is designed to induce a third-order coma aberration if the collimating lens is inclined with respect to the optical axis, it is possible to correct third-order coma aberrations, similarly. However, by employing the meniscus shape as described above, it is possible to increase the amount of third-order coma aberration induced by a predetermined lens tilt, namely a lens tilt of a unit angle, thereby offering the advantage that amounts of tilt thereof are made relatively smaller.

Further, the aspherical surface cross-sectional shapes of the respective surfaces of the collimating lens 21 can be the aspherical surface shapes expressed by "Equation 2" which utilizes an i-th order asphericity coefficient Ai.

$$Z = \frac{h^2/R}{1 + \sqrt{1 - (1+k)(h/R)^2}} + \sum_{i=1}^{N} A_i h^{2i} \qquad \text{[Equation 2]}$$

Further, the collimating lens 21 according to the present embodiment can be either a diffractive lens having a plurality of zones or a lens formed by bonding a plurality of lenses made of different glass materials.

As described above, in the optical pickup device 101 according to the first embodiment of the present invention, coma aberrations in both the radial direction and the tangential direction of the optical disc 1 are corrected, and the correction of coma aberration in the radial direction is performed by the objective-lens actuator 6 which inclines the objective lenses in the radial tilt direction R, while the correction of coma aberration in the tangential direction is performed by the collimating lens actuator 7 which inclines the collimating lens 21 as a coma-aberration correction lens in the tangential tilt direction S. As described above, in the optical pickup device 101, the coma-aberration corrections in the radial direction and in the tangential direction are attained separately by the objective-lens actuator 6 and the collimating lens actuator 7.

With the aforementioned structure, it is possible to simplify the suspension structure for supporting the objective lenses 4a and 4b and the collimating lens 21, thereby enabling reduction of the size of the collimating lens actuator 7. This enables realization of reduction of the size and the thickness of the optical pickup device 101.

Since the coma-aberration correction lens is constituted by the collimating lens 21 suitable for designs having coma-aberration correcting functions, it is possible to reduce the number of components, as a matter of cause, and it is also possible to reduce the volume occupied by the optical system, thereby realizing further reduction of the size and the thickness of the optical pickup device 101.

Further, in the present embodiment, the first tilt direction is set to the direction of the correction of coma aberration in the radial tilt direction R, which enables correcting coma aberration in the radial tilt direction R which is required to be corrected over a large range, by the objective-lens actuator 6 which can be easily inclined in the radial tilt direction R. This enables effective utilization of the volume within the optical pickup device 101.

Further, in the present embodiment, the second tilt direction is set to the direction of the correction of coma aberration in the tangential tilt direction S, which enables making the rotational axis T1 (FIG. 2) for the inclination of the collimating lens 21 parallel with the surface of the optical disc 1, in a case where the optical axis of the coma-aberration correction lens, namely the collimating lens 21 in the present embodiment, is made parallel with the tangential direction Y. Accordingly, by making the optical axis of the collimating lens 21 parallel with the tangential direction Y, it is possible to reduce the size of the optical pickup device 101 in the direction parallel with the tracking direction T. This can reduce the depth size of the optical disc device which incorporates the optical pickup device 101. Furthermore, the suspension flat spring 61 constitutes the component for supporting the collimating lens 21, which functions as the coma-aberration correction lens, rotatably about the rotational axis 1. With this structure, it is possible to prevent the optical pickup device 101 from having an increased size in the thickness direction, thereby realizing reduction of the sizes and the thicknesses of the optical pickup device 101 and the optical disc device.

By applying the structure according to the present embodiment to a thin-type optical pickup device having a height of 21 mm or less from the lower surface of the optical base 33 (FIG. 10) to the apex of an objective lens, it is possible to realize reduction of the size and the thickness more effectively.

Further, by employing the objective-lens actuator 6 as the first coma-aberration correction actuator, it is possible to realize the first coma-aberration correction actuator without changing the suspension. Further, the objective-lens actuator 6 includes the six wires 8 for supporting the movable member 6a movably with respect to the yoke base 11 in the focusing direction F, the tracking direction T and the radial tilt direction R.

Further, the coma-aberration correction actuator for the tangential tilt direction S is provided in the collimating lens actuator as the spherical-aberration correction actuator which is included in the optical pickup device capable of correcting spherical aberrations induced by the change of the substrate thicknesses of optical discs 1. With this structure, it is possible to effectively reduce the size and the thickness of the high-density optical disc device for recording and playback with higher accuracy, in the optical pickup device capable of correction of spherical aberrations due to the change of the substrate thicknesses of optical discs 1.

Further, with the collimating lens actuator 7, it is possible to change the inclination angle of the collimating lens 21 mounted in the carriage 51 at any position of the carriage 51 in the tangential direction Y. This enables optimization of the amount of coma-aberration correction induced according to the position of the collimating lens 21, thereby further improving the quality of record/playback signals in the optical pickup device.

By applying the optical pickup device 101 according to the present embodiment to an optical disc device including an objective-lens actuator incorporating a plurality of objective lenses intended for light sources with a plurality of wavelengths, it is possible to correct coma aberration induced in at least one optical system out of the respective optical systems intended for the respective wavelengths. This eliminates the necessity of process for adjusting coma aberrations initially induced in the optical system intended for at least a single wavelength. Namely, in the optical pickup device which requires adjustments of coma aberrations of at least two types of objective lenses, it is possible to eliminate the process for adjusting the tilts of the objective lenses on the movable member in the objective-lens actuator which is elastically supported. Therefore, due to the elimination of the complicated tilt adjustment process which tends to induce failures of assembled components, it is possible to reduce the number of processes and also it is possible to prevent reduction of the yield due to failures, thereby reducing the cost.

Further, by placing the collimating lens 21 which functions as the coma-aberration correction lens on a single optical path for passing, therethrough, a plurality of luminous fluxes emitted from light sources with a plurality of wavelengths, it is possible to correct respective coma aberrations induced in the optical systems intended for the respective wavelengths. This completely eliminates the necessity of process for adjusting coma aberrations initially induced in the respective optical systems. Therefore, due to the elimination of the initial coma-aberration adjustment process, it is possible to reduce the number of processes, thereby further reducing the cost.

By placing the movable magnets 62 and the fixed tangential tilt coils 63, which function as the tangential tilt drive portion, only in the side closer to the optical disc 1 or only in the side farther therefrom with respect to the center axis T1, it is possible to reduce the thickness of the optical pickup device 101 in the thickness direction of the optical disc 1.

By placing the movable magnets 62 and the fixed tangential tilt coils 63, which function as the tangential tilt drive portion, at positions which form an angle less than 90 degrees with respect to the axis T1, for example, at positions which form an angle of about 45 degrees therewith, about the optical axis of the collimating lens 21, it is possible to further reduce the thickness of the optical pickup device 101.

By providing two tangential tilt drive portions and also placing the two tangential tilt drive portions at two positions which form the same angle less than 90 degrees with respect to the axis T1 about the optical axis of the collimating lens 21, it is possible to realize symmetric tilt driving for the collimating lens 21, thereby realizing tilt driving with higher accuracy.

In the second coma-aberration correction actuator, the movable magnets 62 are mounted in the movable portion including the collimating lens 21, and the fixed tangential tilt coils 63 are secured to the fixture portion which supports the collimating lens 21 through the suspension flat spring 61. In this structure, by supplying electricity to the fixed tangential tilt coils 63, the collimating lens 21 is driven to tilt about the axis T1. With this structure, it is possible to eliminate the necessity of wirings for supplying electricity to the movable portion, thereby suppressing the transfer of heat generated in the fixed tangential tilt drive coils 63 to the collimating lens 21. This can suppress the change of characteristics of the optical pickup device 101, thereby improving the reliability.

There has been described, in the present embodiment, a case where the objective-lens actuator 6 is used as the first coma-aberration correction actuator for correcting coma aberration in the radial tilt direction R, and the collimating lens actuator 7 which is a spherical-aberration correction actuator is used as the second coma-aberration correction actuator for correcting coma aberration in the tangential tilt direction S.

With this structure, it is possible to realize the first coma-aberration correction actuator for correcting coma aberration in the radial tilt direction R, substantially without changing the structures of conventional objective-lens actuators which operate to drive a lens holder incorporating an objective lens in a focusing direction F and in a tracking direction T while supporting the lens holder with wires.

On the other hand, the second coma-aberration correction actuator is required to correct only coma aberration in the remaining tangential tilt direction S, which enables realization of aberration correction with the collimating lens actuator 7 having the simple structure as described above and, in addition thereto, enables improving the resolution for tilt control and ensuring stability against the temperature change and changes with time, at the same time.

Namely, the present invention is characterized in including the first coma-aberration correction actuator for correcting coma aberration in the first direction, and the second coma-aberration correction actuator for correcting coma aberration in the second direction and, with this structure, it is possible to realize an optical pickup device with a simple structure. Further, since, as described above, coma aberration in the radial tilt direction R is corrected by the objective-lens actuator 6 as the first coma-aberration correction actuator, while coma aberration in the tangential tilt direction S is corrected by the collimating lens actuator 7 as the second coma-aberration correction actuator, it is possible to realize an optical pickup device with a more simplified structure.

Second Embodiment

Hereinafter, an optical pickup device according to a second embodiment of the present invention will be described, with reference to the drawings.

Figure 11:
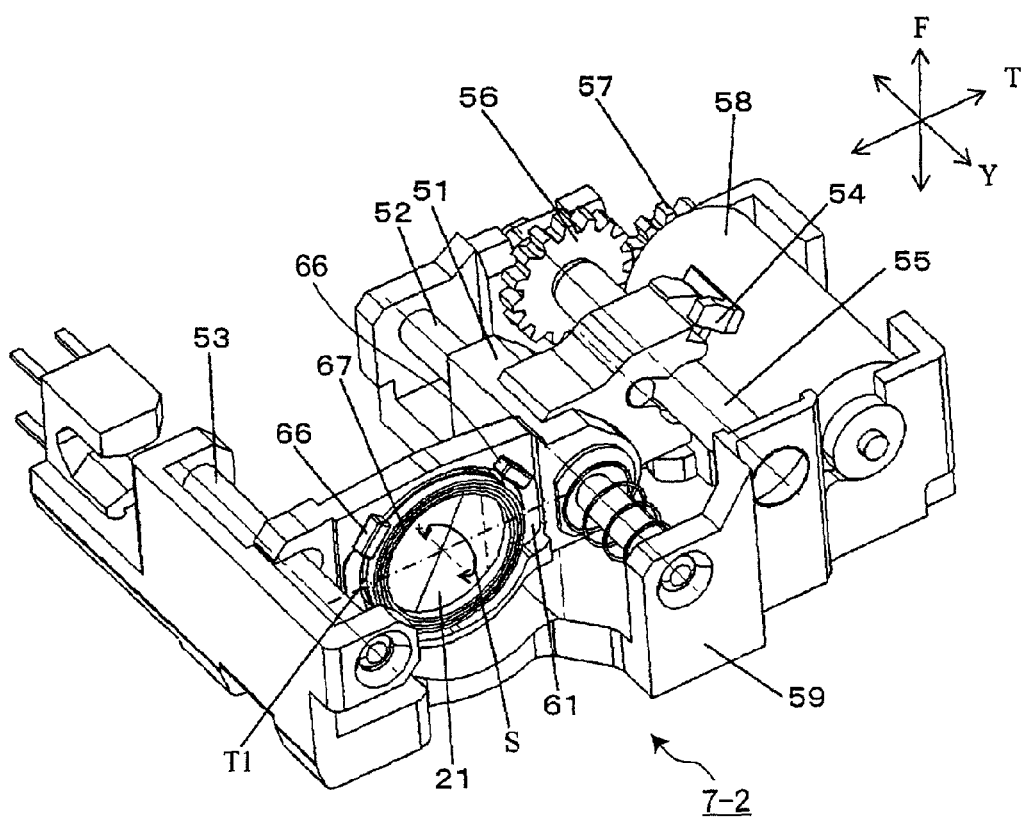
FIG. 11 is a structural view illustrating the structure of a collimating lens actuator in an optical pickup device according to a second embodiment of the present invention.

FIG. 11 is a structural view illustrating the structure of a collimating lens actuator 7-2 in the optical pickup device according to the second embodiment.

Figure 2:
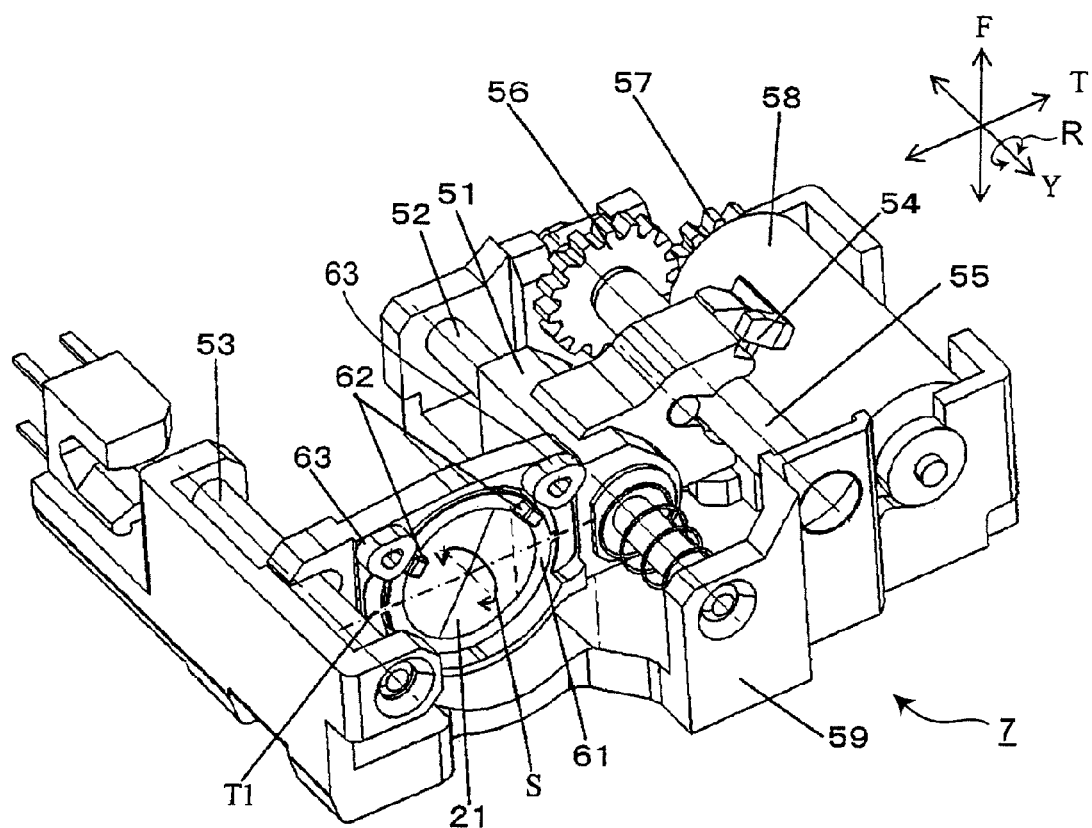
FIG. 2 is a structural view illustrating the structure of a collimating lens actuator in the optical pickup device according to the first embodiment of the present invention.

Referring to FIG. 11, the collimating lens actuator 7-2 is different from the collimating lens actuator 7 illustrated in FIG. 2, in that the movable magnets 62 and the fixed tangential tilt coils 63 in the tangential tilt drive portion in the collimating lens actuator 7 are replaced with fixed magnets 66 and a movable tangential tilt coil 67 in the collimating lens actuator 7-2 according to the second embodiment. No changes are made to the other components of the collimating lens actuator 7-2, and the components having the same functions as those of the collimating lens actuator 7 are designated by the same reference characters.

Accordingly, hereinafter, the collimating lens actuator 7-2 will be described, with respect to only the differences, with reference to FIG. 11.

In the collimating lens actuator 7-2 according to the present embodiment, the single movable tangential tilt coil 67 is installed in a collimating lens 21, and the two fixed magnets 66 are installed on a carriage 51 at positions facing the movable tangential tilt coil 67. The fixed magnets 66 and the movable tangential tilt coil 67 constitute tangential tilt drive portions. The tangential tilt drive portions are placed at positions which are above an axis T1 as a tangential tilt rotational axis, namely closer to the loaded optical disc 1, and form an angle of about 45 degrees with respect to the axis T1.

The fixed magnets 66 are secured to the carriage 51 which is a fixture portion which supports the collimating lens 21 through a suspension flat spring 61, while the movable tangential tilt coil 67 is installed on a movable portion including the collimating lens 21. Accordingly, by supplying electricity to the movable tangential tilt coil 67, the collimating lens 21 is driven to tilt in the tangential tilt direction S about the axis T1. As described above, only the fixed magnets 66 are mounted to the carriage 51, namely the fixture portion, and the fixed magnets 66 have projected areas smaller than that of the fixed tangential tilt coil 63 when viewed in the tangential direction Y, which can further reduce the size of the entire collimating lens actuator 7-2 incorporating the tangential coma-aberration correction actuator.

Third Embodiment

Hereinafter, an optical pickup device according to a third embodiment of the present invention will be described, with reference to the drawings.

Figure 12:
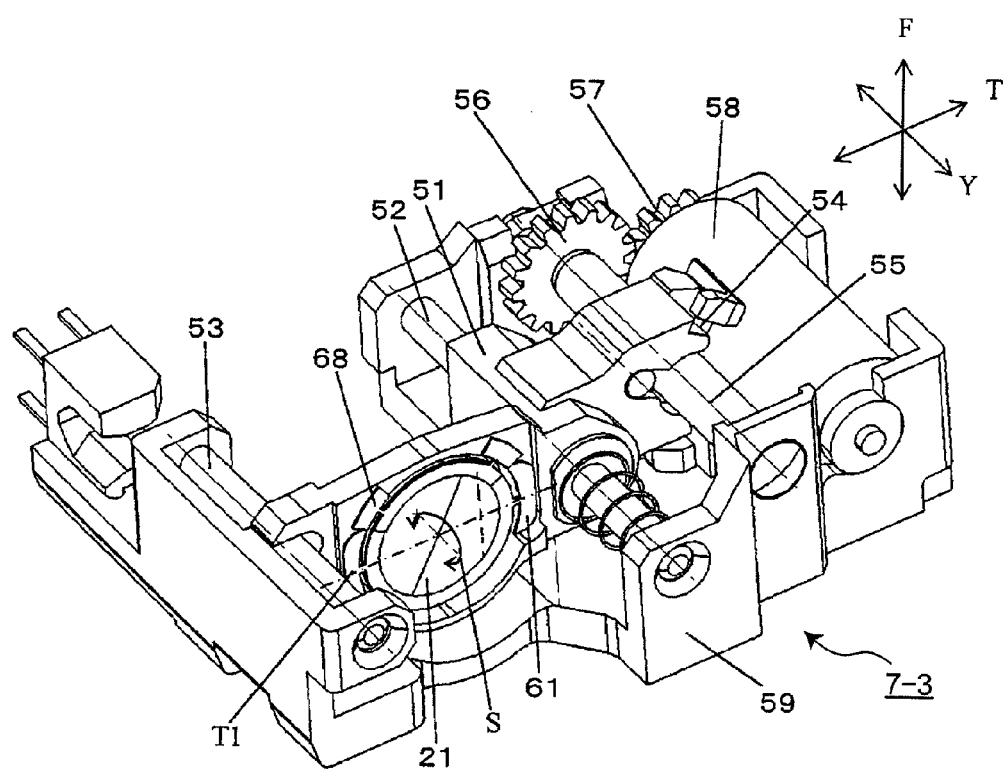
FIG. 12 is a structural view illustrating the structure of a collimating lens actuator in an optical pickup device according to a third embodiment of the present invention.

FIG. 12 is a structural view illustrating the structure of a collimating lens actuator 7-3 in the optical pickup device according to the third embodiment.

Referring to FIG. 12, the collimating lens actuator 7-3 is different from the collimating lens actuator 7 illustrated in FIG. 2, in that the movable magnets 62 and the fixed tangential tilt coils 63 in the tangential tilt drive portion in the collimating lens actuator 7 are replaced with a piezoelectric device 68 in the collimating lens actuator 7-3 according to the third embodiment. No changes are made to the other components of the collimating lens actuator 7-2, and the components having the same functions as those of the collimating lens actuator 7 are designated by the same reference characters.

Accordingly, hereinafter, the collimating lens actuator 7-3 will be described, with respect to only the differences, with reference to FIG. 12.

In the collimating lens actuator 7-3 according to the present embodiment, a movable portion including a collimating lens 21 is coupled, with the piezoelectric device 68, to a carriage 51 which is a fixture portion supporting the collimating lens 21 through a suspension flat spring 61. The expansion/contraction portions of the piezoelectric device 68 are placed at two positions which are above an axis T1 as a tangential tilt rotational axis, namely closer to the loaded optical disc 1, and form an angle of about 45 degrees with the axis T1. By applying a voltage between the opposite ends of the expansion/contraction portions of the piezoelectric device 68, the collimating lens 21 is driven about the axis T1 in the tangential tilt direction S.

In the collimating lens actuator 7-3 including the second coma-aberration correction actuator, the collimating lens 21 is subjected to tangential tilt driving, about the axis T1, using the piezoelectric device 68. This enables simplification of the structure and electric power saving and, also, prevents heat generation due to the driving, which can suppress the changes of characteristics of the optical pickup device, thereby improving the reliability.

Fourth Embodiment

Hereinafter, an optical pickup device according to a fourth embodiment of the present invention will be described, with reference to the drawings.

Figure 13:
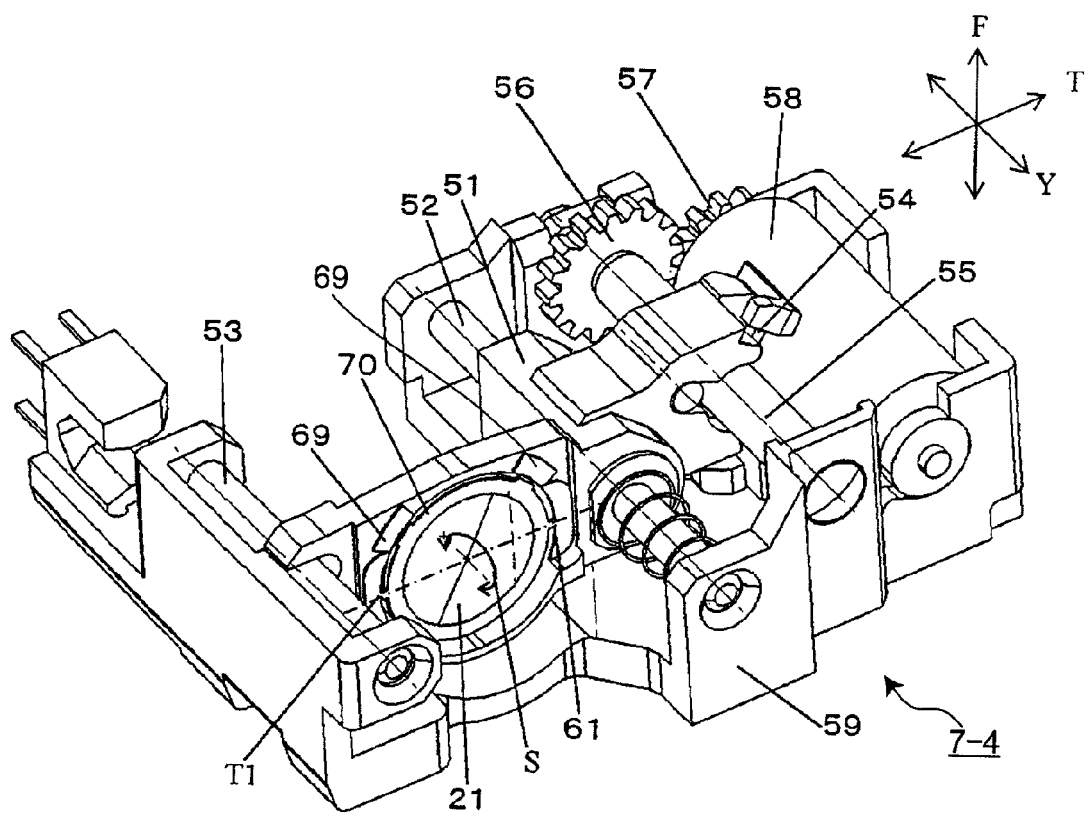
FIG. 13 is a structural view illustrating the structure of a collimating lens actuator in an optical pickup device according to a fourth embodiment of the present invention.

FIG. 13 is a structural view illustrating the structure of a collimating lens actuator 7-4 in the optical pickup device according to the fourth embodiment.

Referring to FIG. 13, the collimating lens actuator 7-4 is different from the collimating lens actuator 7 illustrated in FIG. 2, in that the movable magnets 62 and the fixed tangential tilt coils 63 in the tangential tilt drive portion in the collimating lens actuator 7 are replaced with electrostatic terminals A69 and an electrostatic terminal B70, in the collimating lens actuator 7-4 according to the fourth embodiment. No changes are made to the other components of the collimating lens actuator 7-2, and the components having the same functions as those of the collimating lens actuator 7 are designated by the same reference characters.

Accordingly, hereinafter, the collimating lens actuator 7-4 will be described, with respect to only the differences, with reference to FIG. 13.

In the collimating lens actuator 7-4 according to the present embodiment, a collimating lens 21 is held on one side of the electrostatic terminal B70 which also serves as a suspension, while the other side thereof is secured to a carriage 51. Accordingly, the collimating lens 21 is supported by the electrostatic terminals B rotatably in the tangential tilt direction S. The electrostatic terminals A69 are placed at two positions which are above an axis T1, namely closer to the loaded optical disc 1, and form an angle of about 45 degrees with respect to the axis T1. By applying a voltage between the opposite ends of the electrostatic terminals A69 and the electrostatic terminal B70, the collimating lens 21 is driven about the axis T1 in the tangential tilt direction S, due to the electrostatic forces acting between the electrostatic terminals A69 and the electrostatic terminal B70.

As described above, in the collimating lens actuator 7-4, the collimating lens 21 is driven to tilt, about the axis T1, using the electrostatic forces. This enables simplification of the structure and electric power saving and, also, prevents heat generation due to the driving, which can suppress the changes of characteristics of the optical pickup device, thereby improving the reliability.

Fifth Embodiment

Hereinafter, an optical pickup device according to a fifth embodiment of the present invention will be described, with reference to the drawings.

Figure 14:
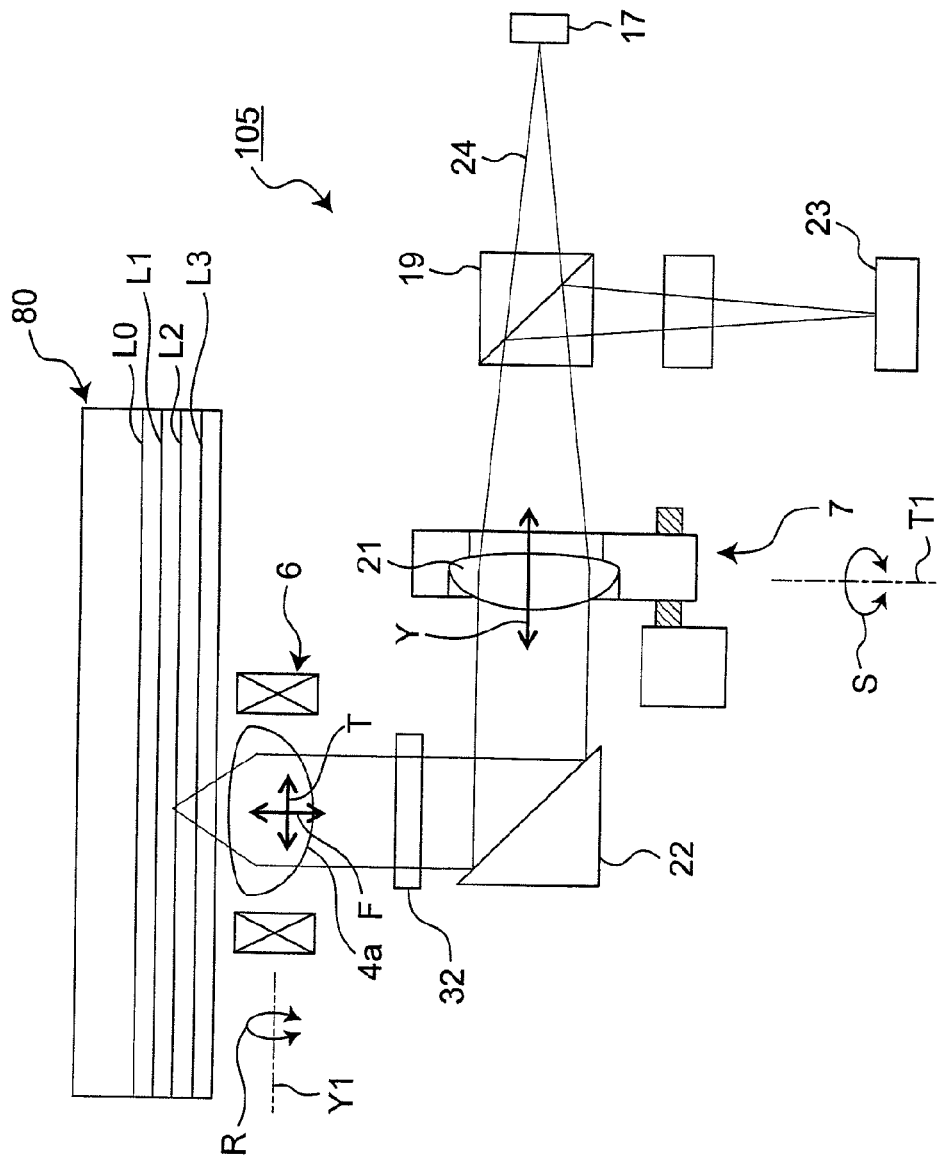
FIG. 14 is a view illustrating the schematic structure of the optical pickup device according to the fourth embodiment of the present invention.

FIG. 14 is a schematic structural view illustrating the structure of the optical pickup device 105 according to the fifth embodiment. In the aforementioned respective embodiments, there has been exemplified the optical pickup device 101 including the three types of light sources 18a, 18b and 17 and the two types of objective lenses 4b and 4a, as illustrated in FIG. 1, in order to enable recording and playback for BDs, as well as CDs and DVDs. The present embodiment will be described, by exemplifying the structure of an optical pickup device dedicated for BDs, as illustrated in FIG. 14, for simplifying the illustration. Further, FIG. 14 provides an illustration in a different manner from that illustrated in FIG. 1, and the components of the optical pickup device 105 which perform identical or similar functions and operations to those of the components of the optical pickup device 101 will be designated by the same reference characters as those of the components of the optical pickup device 101, and will not be described herein.

Figure 15:
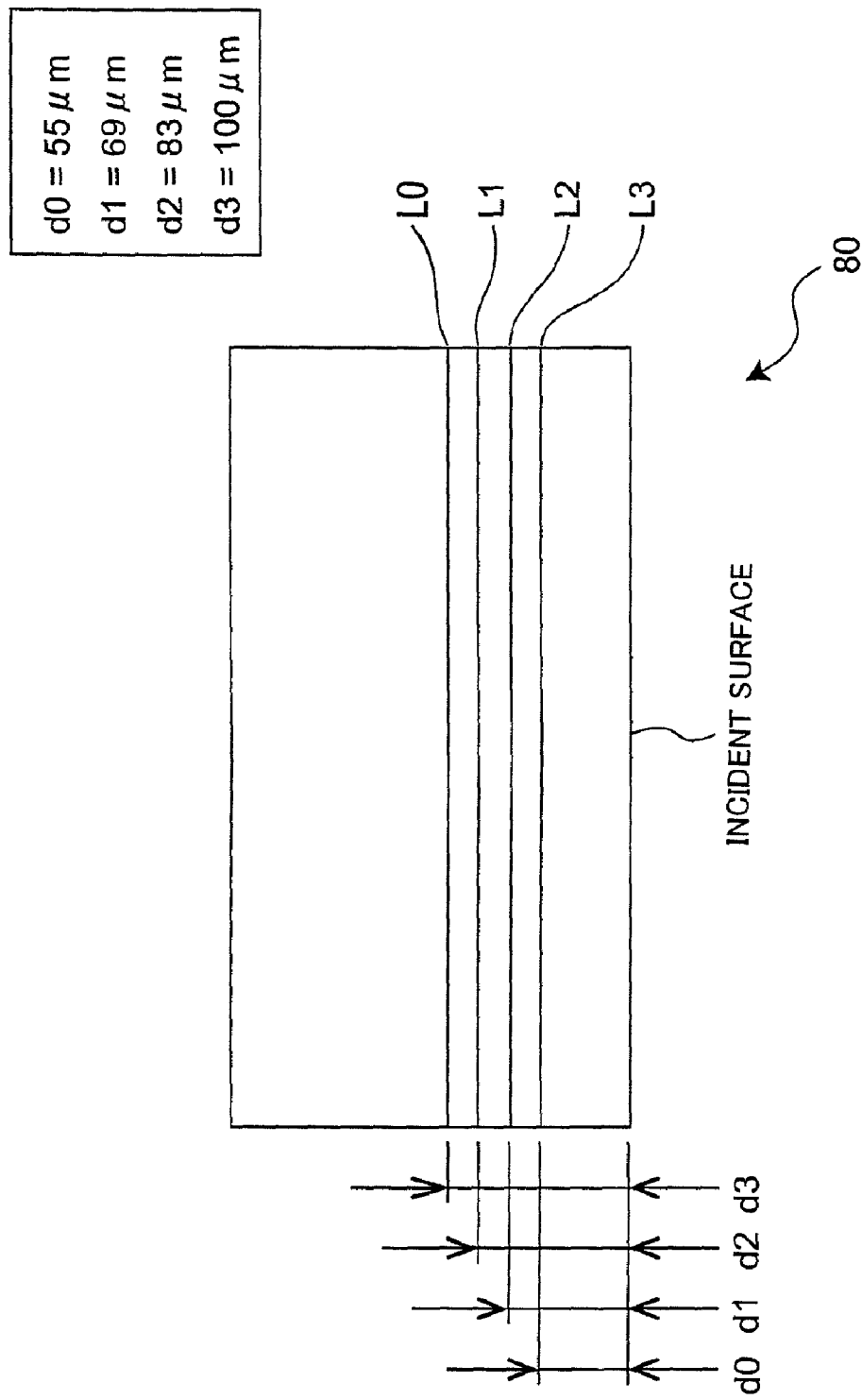
FIG. 15 is a detailed view illustrating a multi-layer optical disc illustrated in FIG. 14.

Further, an optical disc 80 is a BD-intended optical disc and, also, is a multi-layer optical disc including information recording surfaces L0 to L3 having the substrate thicknesses in the range of 55 micrometers to 100 micrometers, as illustrated in FIG. 15, wherein the substrate thicknesses are the thicknesses of the optical transmission layers therein.

Further, in the optical pickup device 105, similarly, as described in the first embodiment, an objective lens 4a mounted in an objective-lens actuator 6 is structured to be capable of inclining in a radial direction (the direction of a radius) of the multi-layer optical disc 80, while a collimating lens 21 mounted in a collimating lens actuator 7 is structured to be capable of inclining in a tangential direction of the multi-layer optical disc 80.

In a case of performing recording or playback for the multi-layer optical disc 80, the optical pickup device 105 performs operations similarly to those of the optical pickup device 101. Namely, blue-violet laser light with a wavelength of about 405 nm which is emitted from a blue-violet laser light source 17 passes through a beam splitter 19, a collimating lens 21, a mirror 22 and a $\lambda/4$ wave plate 32 and, then, is converged, by the objective lens 4a, onto any one of the information recording surfaces L0 to L3 in the multi-layer optical disc 80 to form a light spot. The blue-violet laser light reflected by anyone of the information recording surfaces passes through the objective lens 4a, the $\lambda/4$ wave plate 32, the mirror 22 and the collimating lens 21, again, then is reflected by the beam splitter 19 and enters to a photo detector 23. The laser light detected by the photo detector 23 is subjected to photoelectric conversion and, then, is subjected to operations to form focus error signal and tracking error signal.

Further, the spherical aberrations induced by errors and changes of the substrate thickness of the optical discs 80 are corrected, by moving the collimating lens 21 in the direction of the optical axis (the tangential direction Y) such that the laser light incident to the objective lens 4a becomes divergent light or convergent light.

The amount of third-order coma aberration induced by inclination of the objective lens 4a by a predetermined angle is changed by performing spherical-aberration correction as described above. Namely, with increasing the substrate thickness of the optical disc 80, the amount of induced third-order coma aberration decreases. On the other hand, the amount of coma aberration induced by the inclination of the optical disc 80 itself by a certain angle is increased in proportion to the substrate thickness of the optical disc 80.

Figure 16:
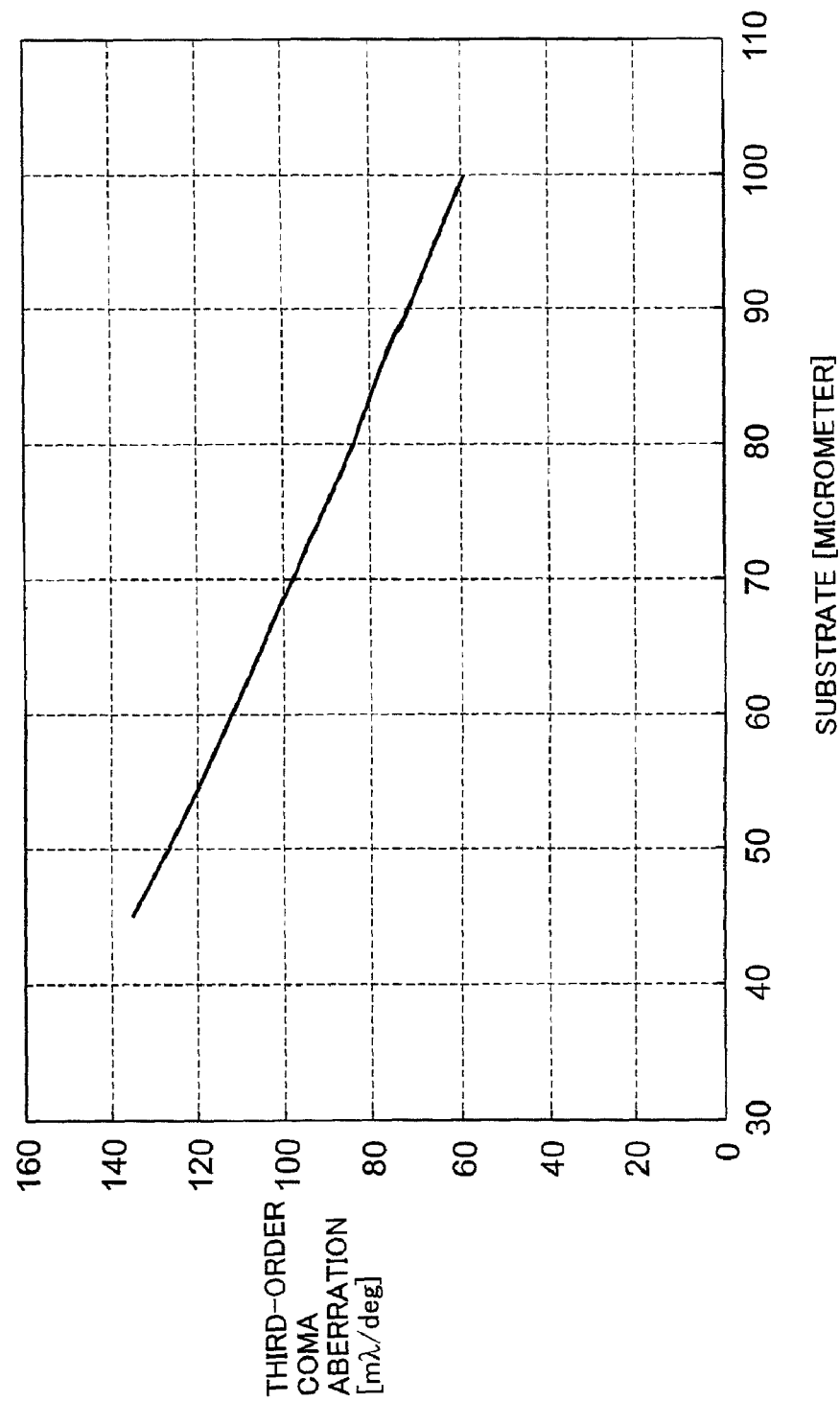
FIG. 16 is a graph illustrating a relationship between substrate thicknesses and amounts of third-order aberrations.

FIG. 16 is a graph illustrating a relationship between the substrate thickness and the amount of third-order coma aberration, regarding the objective lens 4a according to the present embodiment. Referring to FIG. 16, the horizontal axis represents the substrate thickness, while the vertical axis represents the amount of third-order coma aberration induced by the inclination of the objective lens 4a by 1.0 deg (in the case of a lens tilt of 1.0 deg).

Designed conditions of the objective lens 4a according to the fifth embodiment are as follows. Further, the following respective values are illustrative and may be different from the values regarding the objective lenses 4a according to the aforementioned first to fourth embodiments.

Designed Wavelength; 405 nm
Designed Substrate Thickness; 80 micrometers
Focal Length; 1.3 mm
Numerical Aperture; 0.855
Operating Distance; 0.3 mm
Glass Material; VC79

As can be seen from FIG. 16, the third coma aberration induced by the lens tilt of the objective lens 4a decreases with increasing substrate thickness and, also, changes substantially linearly with respect to the change of the substrate thickness. For example, a lens tilt of 1.0 deg induces a third-order coma aberration of 119 mλ, 84 mλ and 59 mλ, in the case of a substrate thickness of 55 micrometers, a substrate thickness of 80 micrometers, and a substrate thickness of 100 micrometers, respectively.

On the other hand, generally, in mounting an objective lens to an optical pickup device, two-axes inclination adjustments of the objective lens are performed on an optical base table (not illustrated) so as to correct coma aberration in the objective lens itself and coma aberrations in other optical systems other than the objective lens. As a common adjustment method, laser light emitted from the objective lens is passed through a reference disc with a predetermined thickness, and wave aberration of the converged light spot is measured. Based on the result of the measurement, two-axes inclination adjustment is performed on the objective lens such that the coma aberration is minimized. Also, a diameter of the light spot converged through the reference disc may be measured, and the two-axes inclination adjustment may be performed on the objective lens such that the light spot diameter is minimized.

Further, since the objective lens is bonded and secured to an objective-lens actuator, two-axes inclination adjustment is performed on the objective lens integrally with the objective-lens actuator. After the adjustment, the objective-lens actuator is bonded and secured to the optical base table, in general.

More specifically, for example, in a case where the coma aberration in the objective lens itself and the coma aberrations in the other optical systems other than the objective lens are 30 mλ in total, when the reference disc used for the two-axes inclination adjustment of the objective lens has a substrate thickness of 80 micrometers, it is possible to correct the aforementioned coma aberration of 30 mλ to approximately zero, by performing two-axes inclination adjustment such that the objective lens is inclined by 0.36 deg.

On the other hand, as described above, the third-order coma aberration induced by the lens tilt of the objective lens is changed with the change of the substrate thickness. Accordingly, as described above, even if the coma aberration is corrected to approximately zero by utilizing the coma aberration in an amount of 30 micrometers in the case of the substrate thickness of 80 micrometers, a coma aberration of 42.5 mλ is induced in the case of a substrate thickness of 55 micrometers, and a coma aberration of 21.1 mλ is induced in the case of a substrate thickness of 100 micrometers. This results in insufficient correction or excessive correction with respect to the coma aberration in the amount of 30 mλ. As such, in a case where there are differences between the substrate thickness of the reference disc and the substrate thickness of the actual optical disc used for recording and playback, coma aberrations may remain during recording and playback. This is an important problem of optical disc devices which perform recording and playback for multi-layer optical discs 80, as in the present embodiment.

In this case, when there is a remaining coma aberration in the radial direction of the multi-layer optical disc 80, it is possible, in the optical pickup device 105 according to the present embodiment, to correct the coma aberration by inclining the objective lens 4a mounted in the objective-lens actuator 6 in the radial direction for each information recording surface in and from which information is to be recorded and played back, similarly to the conventional optical pickup devices. Further, when there is a remaining coma aberration in the tangential direction of the multi-layer optical disc 80, it is possible to correct the coma aberration in the tangential direction, by rotating the collimating lens 21 mounted in the collimating lens actuator 7 in the tangential tilt direction S about the axis T1, with respect to each information recording surface.

Further, similarly to in the optical pickup devices according to the first to fourth embodiments, in the optical pickup device 105 according to the present embodiment, it is possible to correct coma aberrations in the tangential direction in addition to the radial direction, even if there are remaining coma aberrations, due to error of the measurement of wave aberration or light spot diameter, deviations of the attachment and securing of the objective-lens actuator 6 to the optical base table after the measurement, and the like.

As described above, the optical pickup device 105 according to the present embodiment is capable of correcting coma aberrations in the radial direction and, also, is capable of correcting coma aberrations in the tangential direction by rotating the collimating lens 21 mounted in the collimating lens actuator 7 in the tangential tilt direction S, unlike conventional optical pickup devices.

In this case, in a conventional optical disc having two or less information recording surfaces, such as a BD, the difference between the largest substrate thickness and the smallest substrate thickness is 35 micrometers at a maximum and, as described above, in a case of performing inclination adjustment on the objective lens using the reference disc, a remaining coma aberration of 5 mλ or less in the tangential direction is induced. Accordingly, in a case of conventional optical discs having two or less information recording surfaces, it is not largely necessary to correct coma aberration in the tangential direction and, in actual, there are many optical pickup devices which perform no coma-aberration correction for the tangential direction.

On the other hand, in a case of optical discs including three or more information recording surfaces, it is necessary to provide intervals in a predetermined amount between information recording surfaces, in order to alleviate the influence of reflected light from adjacent information recording surfaces, such as crosstalk of information signals, offsets of servo signals due to stray lights reflected by adjacent information recording surfaces. Therefore, it is necessarily necessary to provide a larger difference between the largest substrate thickness and the smallest substrate thickness than those of conventional optical discs.

For example, in an optical disc having three or more information recording surfaces, substantially, the difference between the largest substrate thickness and the smallest substrate thickness is 40 micrometers or more. Accordingly, in a case of performing inclination adjustment on an objective lens using the reference disc as described above, the remaining coma aberration in the tangential direction exceeds 10 mλ, which is not negligible.

It can be said that the optical pickup device according to the present embodiment is particularly effective for addressing the problems specific to optical discs 80 including three or more information recording surfaces and having a large difference between the largest substrate thickness and the smallest substrate thickness, as described above.

Next, there will be described a method for learning coma aberration with the optical pickup device 105 according to the present embodiment.

Figure 17:
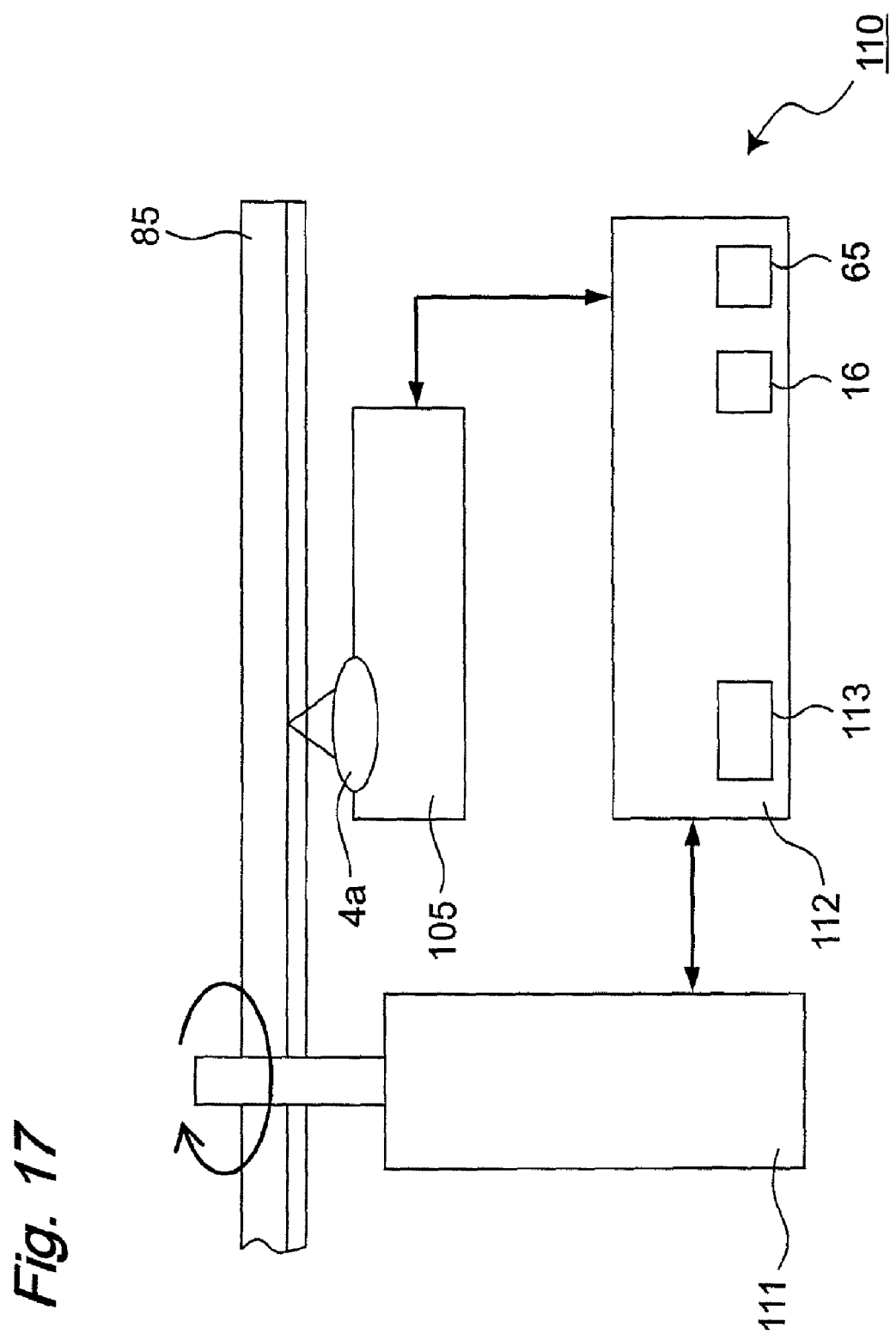
FIG. 17 is a view illustrating the schematic structure of an optical disc device including the optical pickup device illustrated in FIG. 14.

FIG. 17 illustrates the schematic structure of an optical disc device 110. The optical disc device 110 includes, in addition to the optical pickup device 105, an optical disc drive portion 111 for driving and rotating an optical disc 80, and a control portion 112 which drives and controls the optical disc drive portion 111 and the optical pickup device 105. Further, the optical disc device 110 illustrated in FIG. 17 has an exemplary structure including the control portion 112 having the objective-lens actuator drive circuit portion 16 and the tangential tilt drive circuit portion 65 as described above. The control portion 112 has the function of performing signal processing on control signals and information signals obtained from the optical pickup device 105 and the function of interfacing between the outside and the inside of the optical disc device 110 for the information signals.

The method for learning coma aberration with the optical disc device 110 having the aforementioned structure is implemented as follows.

At first, a reference optical disc 85 for coma-aberration learning is loaded in the optical disc device 110. Further, the control portion 112 moves the optical pickup device 105 to a predetermined position in a radial direction of the loaded reference optical disc 85 and starts a playback operation. The control device 112 drives the objective lens 4a included in the objective-lens actuator 6 in the optical pickup device 105 in the focusing direction F and in the tracking direction T and further drives the objective lens 4a in the radial direction of the reference optical disc 85, based on the focus error signal and tracking error signal obtained from the optical pickup device 105. Thus, the control portion 112 determines an optimum inclination angle $\alpha$ of the objective lens 4a in the objective-lens actuator 6 which optimizes a predetermined playback signal index (jitter or the like).

The determined optimum inclination angle $\alpha$ is stored in a storage portion in the optical disc device 110, such as a storage portion 113 included in the control portion 112.

Next, the control portion 112 determines an optimum inclination angle $\beta$ of the collimating lens 21 included in the collimating lens actuator 7 which optimizes a predetermined playback signal index (jitter or the like), while driving, in the tangential direction Y of the optical disc 85, the collimating lens 21 included in the collimating lens actuator 7 in the optical pickup device 105. The determined optimum inclination angle $\beta$ is stored the storage portion 113.

On the other hand, the optimum inclination angle $\alpha$ and the optimum inclination angle $\beta$ for a multi-layer optical disc are varied for each of the information recording surfaces having different substrate thicknesses. Accordingly, for a multi-layer optical disc, it is preferable that the learning of the optimum inclination angles $\alpha$ and $\beta$ using the reference optical disc 85 is performed for all the information recording surfaces, for example, four information recording surfaces L0 to L3 in a case where the multi-layer optical disc 80 includes the four information recording surfaces, as the multi-layer optical disc 80 according to the present embodiment, and the respective optimum inclination angles are recorded as $\alpha 0$ to $\alpha 3$ and $\beta 0$ to $\beta 3$.

Further, the learning for the optimum inclination angles $\alpha 0$, $\alpha 3$, $\beta 0$ and $\beta 3$ is performed for only two information recording surfaces, which are the information recording surface L0 with a largest substrate thickness (100 micrometers) and the information recording surface L3 with a smallest substrate thickness (55 micrometers) to obtain the optimum inclination angles $\alpha 0$, $\alpha 3$, $\beta 0$ and $\beta 3$. Further, it is also possible to estimate the optimum inclination angles $\alpha 1$, $\alpha 2$, $\beta 1$ and $\beta 2$ for the intermediate information recording surfaces L1 and L2, using these optimum inclination angles $\alpha 0$, $\alpha 3$, $\beta 0$ and $\beta 3$. By performing the aforementioned learning for the optimum inclination angles, it is possible to shorten the learning time.

The optimum inclination angles $\alpha 0$ to $\alpha 3$ and $\beta 0$ to $\beta 3$ stored using the reference optical disc 85 as described above are associated with the information recording surfaces L0 to L3 in the multi-layer optical disc 80 to be actually subjected to recording and playback. Accordingly, the optimum inclination angle of the objective lens 4a included in the objective-lens actuator 6 is set to any of $\alpha 0$ to $\alpha 3$, and the optimum inclination angle of the collimating lens 21 included in the collimating lens actuator 7 is set to any of $\beta 0$ to $\beta 3$, according to the substrate thickness of the targeted information recording surface. With this structure, it is possible to preferably record and playback information in and from the multi-layer optical disc 80.

Further, the optical pickup device 105 according to the present embodiment performs spherical-aberration correction by moving the collimating lens 21 in the collimating lens actuator 7 in the direction of the optical axis (the tangential direction Y), according to the substrate thickness of the information recording surface in and from which information is to be recorded or played back. Accordingly, the position of the collimating lens 21 in the direction of the optical axis according to the substrate thickness of the targeted information recording surface is uniquely determined. Accordingly, it is possible to set the optimum inclination angles $\beta 0$ to $\beta 3$ of the collimating lens 21 in association with positions of the collimating lens 21 in the direction of the optical axis of the collimating lens 21.

As described above, in the present fifth embodiment, there has been described the fact that this embodiment is particularly effective for an optical pickup device intended for optical discs having a large difference between a largest substrate thickness and a smallest substrate thickness, such as multi-layer optical discs including three or more information recording surfaces, more specifically next-generation optical discs having a difference of 40 micrometers or more between a largest substrate thickness and a smallest substrate thickness.

However, the coma-aberration learning method described in the fifth embodiment (the optimum-inclination-angle learning method), the method for setting the optimum inclination angle of the collimating lens according to the substrate thickness of the information recording surface or the optimum-inclination-angle setting method for setting the optimum inclination angle of the collimating lens according to the position of the collimating lens in the direction of the optical axis is not limited to the optical pickup device intended for multi-layer optical discs including three or more information recording surfaces having the substrate thickness difference equal to or more than the 40 micrometers.

For example, in a case where the coma-aberration learning method is applied to an optical pickup device including an objective-lens actuator incorporating a plurality of objective lenses intended for light sources with a plurality of wavelengths, it is possible to perform learning of coma aberration in the tangential direction which is induced in at least one optical system, out of the respective optical systems intended for the respective wavelengths, according to the above mentioned method. For example, in a structure including a collimating lens placed in the same optical path for passing, therethrough, a plurality of luminous fluxes emitted from light sources with a plurality of wavelengths, it is possible to perform learning of respective coma aberrations induced in the optical systems intended for the respective wavelengths and to store the respective coma aberrations, which offers the advantage that the optimum inclination angles can be rapidly set in recording and playback for optical discs intended for the respective optical systems.

In this case, it is preferable to set the optimum inclination angle, at the timing when the type of an optical disc is determined by loading this optical disc into the optical disc device. In a case where the collimating lens should be moved in the direction of the optical axis according to the type of the optical disc, it is preferable to perform the moving of the collimating lens in the direction of the optical axis and the setting of the optimum inclination angles at the same time.

Further, it is possible to combine arbitrary embodiments out of the aforementioned various embodiments to offer the advantages of the respective embodiments.

Although the present invention has been sufficiently described with respect to preferred embodiments with reference to the accompanying drawings, various changes and modifications will be apparent to those skilled in the art. It should be understood that such changes and modifications are intended to fall within the preferred embodiments, without departing from the scope of the present invention defined by the appended claims.

Further, the disclosures of the specification, the drawings, the claims and the abstract of Japanese Patent Application No. 2007-264309, filed on Oct. 10, 2007 are hereby incorporated by reference in their entireties.

INDUSTRIAL APPLICABILITY

The optical pickup device according to the present invention is effective in reducing the size and the thickness of an optical pickup device incorporating a lens actuator having a coma-aberration correcting function for realizing an optical pickup device capable of recording and playback for optical discs with high recording densities.

The invention claimed is:

1. An optical pickup device which records or plays back information in or from an optical recording medium by condensing a luminous flux emitted from a light source onto the optical recording medium through a light-condensing optical system, the optical pickup device comprising:
a first coma-aberration correction actuator including a first tilt drive portion configured to incline, in a first tilt direction, an objective lens for converging emitted light onto said optical recording medium; and
a second coma-aberration correction actuator including a second tilt drive portion configured to incline, in a second tilt direction, a coma-aberration correction lens placed between said light source and a raising mirror for reflecting said emitted light toward said objective lens, wherein,
said coma-aberration correction lens is a collimating lens configured to convert divergent light emitted from said light source into substantially-parallel light,
said second coma-aberration correction actuator includes an elastic support spring, this elastic support spring has a center axis at least in the direction parallel to said optical recording medium and supports said coma-aberration correction lens at the opposite sides of said coma-aberration correction lens such that said coma-aberration correction lens can tilt about said center axis, and said second tilt drive portion drives said coma-aberration correction lens to tilt it about said center axis,
said first coma-aberration correction actuator has two or more objective lenses intended for luminous fluxes with two or more wavelengths which are emitted from said light source, and is capable of driving said two or more objective lenses in three directions which are a focusing direction which is a direction perpendicular to said optical recording medium, a tracking direction which is a direction parallel to a radial direction of said optical recording medium, and said first tilt direction corresponding to a tilt direction which is a direction about an axis parallel to a tangential direction of said optical recording medium.

2. The optical pickup device according to claim 1, wherein
said first tilt direction is the direction of correction of coma aberration in the radial direction of said optical recording medium, and said second tilt direction is the direction of correction of coma aberration in the tangential direction of said optical recording medium.

3. The optical pickup device according to claim 1, further comprising an optical base configured to mount said light-condensing optical system thereon, wherein a height from the lower surface of said optical base to the apex of said objective lens is 21 mm or less.

4. The optical pickup device according to claim 1, wherein at least said coma-aberration correction lens is placed such that its optical axis is along a direction parallel to the tangential direction of said optical recording medium, and a luminous flux is folded, by said raising mirror, in a direction perpendicular to said optical recording medium and then enters to said objective lens.

5. The optical pickup device according to claim 1, wherein
said first coma-aberration correction actuator is an objective-lens actuator comprising
a movable member including said objective lens and a lens holder for holding said objective lens,
a base, and
a rod-type elastic support member which supports said movable member movably with respect to said base in the focusing direction, the tracking direction and said first tilt direction.

6. The optical pickup device according to claim 1, further comprising a spherical-aberration correction actuator including a carriage configured to support said coma-aberration correction lens and a drive portion configured to drive said carriage in the tangential direction of said optical recording medium,
wherein said second coma-aberration correction actuator is mounted in said carriage.

7. The optical pickup device according to claim 6, wherein the inclination angle of said coma-aberration correction lens mounted in said second coma-aberration correction actuator is changed according to a position of said carriage in the tangential direction of said optical recording medium.

8. The optical pickup device according to claim 6, wherein
the inclination angle of the coma-aberration correction lens mounted in said second coma-aberration correction actuator is made constant, regardless of a position of said carriage in the tangential direction of said optical recording medium.

9. The optical pickup device according to claim 1, wherein
said coma-aberration correction lens is placed on the same optical path for passing, therethrough, luminous fluxes with said two or more wavelengths.

10. The optical pickup device according to claim 1, wherein
said second tilt drive portion is placed only in the side closer to said optical recording medium or only in the side farther therefrom with respect to said center axis.

11. The optical pickup device according to claim 1, wherein
said second tilt drive portion is placed at a position which forms an angle less than 90 degrees with respect to said center axis about the optical axis of said coma-aberration correction lens.

12. The optical pickup device according to claim 1, comprising two second tangential tilt drive portions, wherein said two second tangential tilt drive portions are placed at two positions which form the same angle less than 90 degrees with respect to said center axis about the optical axis of said coma-aberration correction lens.

13. The optical pickup device according to claim 1, wherein, in said second coma-aberration correction actuator, magnets are mounted in a movable portion including said coma-aberration correction lens, such that, by supplying electricity to driving coils secured to a fixture portion which supports said coma-aberration correction lens through said elastic support spring, said coma-aberration correction lens is driven to tilt about said center axis.

14. The optical pickup device according to claim 1, wherein, in said second coma-aberration correction actuator, magnets are secured to a fixture portion which supports said coma-aberration correction lens through said elastic support spring, such that, by supplying electricity to a driving coil mounted in a movable portion including said coma-aberration correction lens, said coma-aberration correction lens is driven to tilt about said center axis.

15. The optical pickup device according to claim 1, wherein, in said second coma-aberration correction actuator, a movable portion including said coma-aberration correction lens and a fixture portion which supports said coma-aberration correction lens through said elastic support spring are coupled to each other through a piezoelectric device, such that, by applying a voltage between the opposite ends of said piezoelectric device, said coma-aberration correction lens is driven to tilt about said center axis.

16. The optical pickup device according to claim 1, wherein, in said second coma-aberration correction actuator, respective electrostatic terminals are mounted in a movable portion including said coma-aberration correction lens and a fixture portion which supports said coma-aberration correction lens through said elastic support spring, such that, by applying potential differences across said electrostatic terminals, said coma-aberration correction lens is driven to tilt about said center axis.

17. The optical pickup device according to claim 1, wherein
said coma-aberration correction lens is a meniscus lens having a first surface which is convex and is close to said raising mirror and a second surface which is concave and is close to said light source,
said collimating lens satisfies a condition r1<r2, assuming that an absolute value of a paraxial radius of curvature of said first surface is r1, and an absolute value of a paraxial radius of curvature of said second surface is r2, and
at least one of said first surface and said second surface has an aspherical surface shape.

18. The optical pickup device according to claim 17, wherein
the aberration induced in the light spot converged on said optical recording medium by an inclination of said coma-aberration correction lens is constituted substantially only by a third-order coma aberration.

19. An optical pickup device which records or plays back information in or from an optical recording medium by condensing a luminous flux emitted from a light source onto the optical recording medium through a light-condensing optical system, the optical pickup device comprising:
a first coma-aberration correction actuator including a first tilt drive portion configured to incline, in a first tilt direction, an objective lens for converging emitted light onto said optical recording medium; and
a second coma-aberration correction actuator including a second tilt drive portion configured to incline, in a second tilt direction, a coma-aberration correction lens placed between said light source and a raising mirror for reflecting said emitted light toward said objective lens, wherein,
said coma-aberration correction lens is a collimating lens configured to convert divergent light emitted from said light source into substantially-parallel light,
in said collimating lens, an offense against a sine condition SC for a wavelength of $\lambda$ satisfies a condition $-0.0015 > SC > -0.2$, assuming that a height of a position on said collimating lens which is farthest from the optical axis is h, an angle which a light ray passed through said position at the height h forms with said optical axis is $\theta$, a focal length for light with the wavelength of $\lambda$ is f, and the offense against the sine condition SC is defined as $SC = h/(f \cdot \sin \theta) - 1$.

20. The optical pickup device according to claim 19, wherein
said collimating lens is a meniscus lens having a first surface which is convex and is close to said raising mirror and a second surface which is concave and is close to said light source,
said collimating lens satisfies a condition r1<r2, assuming that an absolute value of a paraxial radius of curvature of said first surface is r1, and an absolute value of a paraxial radius of curvature of said second surface is r2, and
at least one of said first surface and said second surface has an aspherical surface shape.

21. The optical pickup device according to claim 19, wherein
the aberration induced in the light spot converged on said optical recording medium by an inclination of said collimating lens is constituted substantially only by a third-order coma aberration.

22. The optical pickup device according to claim 19, wherein
said first tilt direction is the direction of correction of coma aberration in the radial direction of said optical recording medium, and said second tilt direction is the direction of correction of coma aberration in the tangential direction of said optical recording medium.

23. The optical pickup device according to claim 19, further comprising a spherical-aberration correction actuator including a carriage configured to support said coma-aberration correction lens and a drive portion configured to drive said carriage in the tangential direction of said optical recording medium,
wherein said second coma-aberration correction actuator is mounted in said carriage.

24. The optical pickup device according to claim 23, wherein the inclination angle of said coma-aberration correction lens mounted in said second coma-aberration correction actuator is changed according to a position of said carriage in the tangential direction of said optical recording medium.

25. The optical pickup device according to claim 23, wherein the inclination angle of the coma-aberration correction lens mounted in said second coma-aberration correction actuator is made constant, regardless of a position of said carriage in the tangential direction of said optical recording medium.

* * * * *